US009482781B2

(12) United States Patent
Kamal et al.

(10) Patent No.: US 9,482,781 B2
(45) Date of Patent: *Nov. 1, 2016

(54) SYSTEMS, TRANSMITTER ASSEMBLIES, AND ASSOCIATED PROPULSION DEVICES TO EXPLORE AND ANALYZE SUBTERRANEAN GEOPHYSICAL FORMATIONS

(71) Applicant: Saudi Arabian Oil Company, Dhahran (SA)

(72) Inventors: Rami Ahmed Kamal, Dhahran (SA); Modiu L. Sanni, Dhahran (SA); Mazen Y. Kanj, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 14/745,599

(22) Filed: Jun. 22, 2015

(65) Prior Publication Data

US 2015/0285945 A1    Oct. 8, 2015

Related U.S. Application Data

(62) Division of application No. 12/722,357, filed on Mar. 11, 2010, now Pat. No. 9,063,252.

(60) Provisional application No. 61/159,943, filed on Mar. 13, 2009.

(51) Int. Cl.
*G01V 11/00* (2006.01)
*E21B 47/00* (2012.01)
(Continued)

(52) U.S. Cl.
CPC .............. *G01V 11/00* (2013.01); *E21B 47/09* (2013.01); *E21B 47/122* (2013.01); *G01V 11/002* (2013.01); *H02J 7/0042* (2013.01)

(58) Field of Classification Search
CPC .............................. G01V 11/00; E21B 47/122
USPC .......................................................... 702/13
See application file for complete search history.

(56) References Cited

U.S. PATENT DOCUMENTS 6,443,228 B1    9/2002  Aronstam et al.
6,739,165 B1    5/2004  Strack
(Continued)

FOREIGN PATENT DOCUMENTS

WO        03089757 A1    10/2003
WO     2005012079 A1     2/2005
(Continued)

OTHER PUBLICATIONS

Saudi Aramco: "Nano Resbots: Navigating the Reservoirs of Tomorrow," Jun. 3, 2008, RIGZONE (http://www.rigzone.com/news/article/asp?a)id=5795>, pp. 1-2.
(Continued)

*Primary Examiner* — Gregory J Toatley
*Assistant Examiner* — Michael Dalbo
(74) *Attorney, Agent, or Firm* — Bracewell LLP; Constance G. Rhebergen; Christopher L. Drymalla

(57) ABSTRACT

Systems and transmitter assemblies for exploring geophysical formations at great depths. In order to explore the formation, transmitter assemblies with a size less than 500 nanometers are inserted into the formation. The transmitter assemblies include propulsion devices to propel through the formation, analyzing fluids and conditions as each moves through the formation. The transmitter assemblies can communicate with a machine on the surface via a series of receivers and transmitters located in the wellbore. The machine on the surface is able to combine and analyze the data from the nanorobots to create a three dimensional map of the formation. The map shows the locations of pathways through the formation, pockets of hydrocarbons within the formation, and the boundaries of the formation.

12 Claims, 23 Drawing Sheets

(51) Int. Cl.
  *E21B 47/09* (2012.01)
  *E21B 47/12* (2012.01)
  *H02J 7/00* (2006.01)

(56) References Cited

U.S. PATENT DOCUMENTS

| | | | |
|---|---|---|---|
| 7,052,854 B2 | 5/2006 | Melker et al. | |
| 9,063,252 B2* | 6/2015 | Kamal | G01V 11/00 |
| 2002/0149498 A1* | 10/2002 | Tabanou | E21B 7/061 |
| | | | 340/854.5 |
| 2004/0136893 A1 | 7/2004 | Horiuchi et al. | |
| 2005/0055162 A1 | 3/2005 | Gao et al. | |
| 2005/0081398 A1 | 4/2005 | Sun et al. | |
| 2006/0055403 A1 | 3/2006 | Freedman | |
| 2006/0148528 A1 | 7/2006 | Jung et al. | |
| 2007/0079997 A1 | 4/2007 | Chan et al. | |
| 2008/0241264 A1 | 10/2008 | Solomon | |
| 2008/0252479 A1 | 10/2008 | Mathiszik | |
| 2009/0211754 A1 | 8/2009 | Verret et al. | |
| 2010/0102986 A1* | 4/2010 | Benischek | E21B 47/122 |
| | | | 340/855.8 |
| 2010/0242585 A1* | 9/2010 | Pratyush | E21B 21/00 |
| | | | 73/152.04 |

FOREIGN PATENT DOCUMENTS

| | | |
|---|---|---|
| WO | 2006/119618 | 11/2006 |
| WO | 2007056278 A1 | 5/2007 |
| WO | 2009/044781 | 4/2009 |

OTHER PUBLICATIONS

Annex to Form PCT/ISA/206, Communication Relating to the Results of the Partial International Search, dated Jun. 21, 2010 for International Patent Application No. PCT/US2010/0271717, pp. 1-3.

Modui L. Sanni et al., "Reservoir Nanorobots," Saudi Aramco Journal of Technology, Mar. 31, 2008, pp. 44-52.

Rami Kamal, "A Proposal for Debate—Nanorobot Technology for Mapping Erratic High Permeability Pathways in Carbonate Crude Oil Reservoirs," GeoFrontier, Published by the Shahran Geoscience Society, vol. 1, Issue 4, Dec. 2003, pp. 18-23.

Roger Highfield, "Molecular computer could be 'nanobot brain'" http://www.telegraphc.co.uk/science/science-news/3335605/Molecular-computer-could-be-nanobot-brain.html, Mar. 10, 2008, pp. 1-2.

Patrick L. Barry, "The Next Giant Leap" http://science.nasa.headlines/y2005/27jul_nanotech.htm, Jul. 27, 2005, pp. 1-5.

D. Ashwini et al. "Nano Medicine—An Emerging Field in Nanotechnology" Paper2, http://www.scribdcom/doc/7213467/Nano-2, Oct. 18, 2008, pp. 1-5.

Adriano Cavalcanti et al. "Nanorobotic Challenges in Biomedical Applications, design and control" IEEE ICECS Int'l Conf. on Electronics, Circuits and Systems, Dec. 2004, pp. 1-4.

Leslie Rubinstein "A Practical NanoRobot for Treatment of Various Medical Problems" The Foresight Institute, http://foresight.org/Conferences/MNT8/Papers/Rubenstein, Nov. 3, 2000, pp. 1-34.

Keiichi Namba et al. "Nanobiology Laboratories Protonic NanoMachine Group" Graduate School of Frontier Biosciences, http://fbs.osaka-u.ac.jp/eng/labo/09a.html, at least as early as Mar. 9, 2008, pp. 1-5.

"Carnegie Mellon University's top down approach to nanobots" Next Big Future, http://nextbigfuture.com/2006/07/carnegie-mellon-universitys-top-down.html, Jul. 20, 2006, pp. 1-3.

"Nanotechnology Starts with a Dare: Feynman's Big 'Little Challenges'" NanoScienceWorks, http://www.nanoscienceworks.org/publications/just-in-print/nanotechnology-starts-with-a-dare-feynman2019s-big-little-challenges, 2010, pp. 1-3.

Christine Peterson "Japan takes lead in medical nanorobots" Foresight Institute, http://www.foresight.org/nanodot/?p=2687, Mar. 11, 2008, pp. 1-2.

"Nanorobotics" CAN Center for Automation in Nanobiotech, http://www.nanorobotdesign.com/, at least as early as Mar. 1, 2008, pp. 1-8.

"U.S., Chinese scientists build nanorobot" Space Daily, http://www.spacedaily.com/reports/US_Chinese_scientists_build_nanorobot_999.html, Feb. 16, 2009, pp. 1-3.

"Brain surgery with performed by an nanorobot" Jabulela, http://www.jabulela.com/science-tech/brain-surgery-performed-nanorobot, Jan. 21, 2009, pp. 1-4.

"Biomolecular Motors" Nano Science and Technology Institute, http://www.nsti.org/outreach/biomolecular_Motors/, 2004, pp. 1-9.

Saudi Aramco News "Nanorobots: Getting Small in a Big Way" http://www.aramcoexpats.com/Articles/Pipeline/Saudi-Aramco-News/Dhahran-Media/3015.aspx, Mar. 5, 2008, pp. 1-3.

Extended European Search Report for EP Application No. 15179146.4-1558 dated Jan. 8, 2016; pp. 1-9.

Hianggi, Peter; et al. "Artificial Browian motors: Controlling transport on the nanoscale" Institut fur Universitat Augsburg, Universitatsstr. 1, D-86135 Augsburg, Germany, Sep. 24, 2008; pp. 1-57.

Extended European Search Report for application 15179162.1 dated Jan. 18, 2016; pp. 1-9.

Partial European Search Report for application 15179159.7 dated Jan. 26, 2016; pp. 1-7.

Extended European Search Report for application 15179155.5 dated Jan. 25, 2016; pp. 1-10.

* cited by examiner

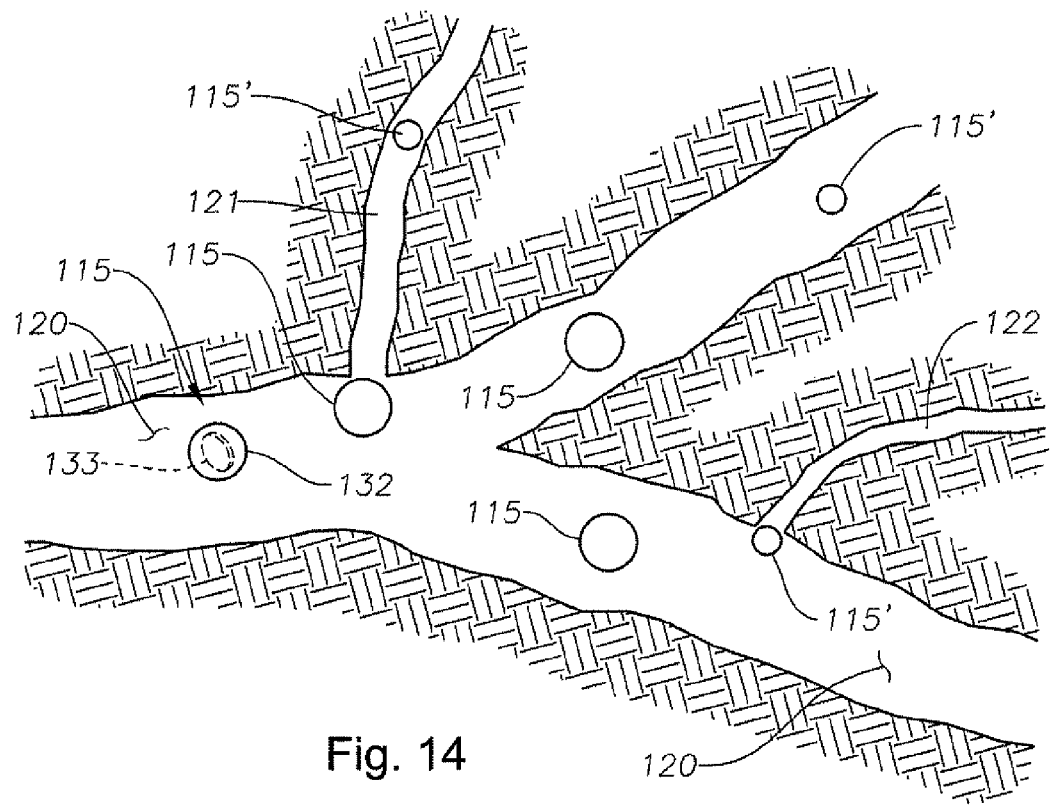
Fig. 14
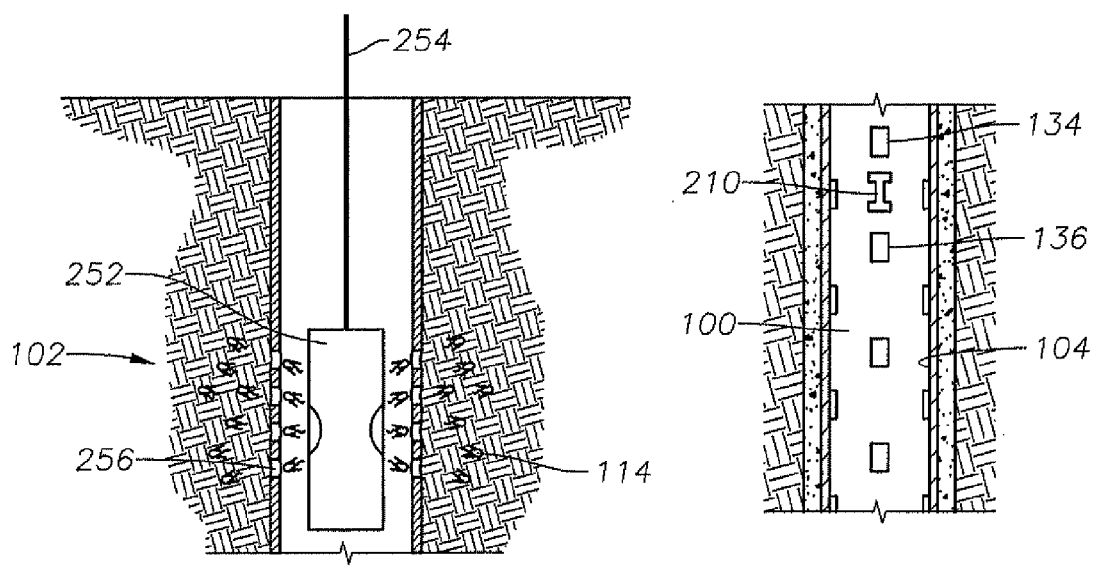
Fig. 16
Fig. 18

SYSTEMS, TRANSMITTER ASSEMBLIES, AND ASSOCIATED PROPULSION DEVICES TO EXPLORE AND ANALYZE SUBTERRANEAN GEOPHYSICAL FORMATIONS

RELATED APPLICATIONS

This patent application is a divisional of U.S. Non-Provisional patent application Ser. No. 12/722,357, titled "System, Method, and Nanorobot to Explore Subterranean Geophysical Formations" and filed on Mar. 11, 2010, which claims the benefit of and priority to U.S. Provisional Patent Application No. 61/159,943, titled "System, Method, and Nanorobot to Explore Subterranean Geophysical Formations" and filed on Mar. 13, 2009, the contents both of which are incorporated herein by reference in their entireties.

BACKGROUND OF THE INVENTION

1. Field of the Invention

This invention generally relates to the field of exploring underground rock and hydrocarbon formations. In particular, the present invention is directed to a method and apparatus for using transmitter assemblies to move through a subsurface formation to identify various geophysical characteristics.

2. Description of the Related Art

The overriding problem in exploring for hydrocarbons in the subsurface is the probing in, and characterizing of, an environment that cannot be seen. Similarly once a commercial hydrocarbon deposit has been discovered and is about to be developed and exploited much conjecture and many assumptions must be made by reservoir geologists and reservoir engineers in the modeling of a large volume of rock which cannot be seen.

Subsurface reservoir data is currently acquired from probes lowered into boreholes and from images (seismography). In the first instance, the data is handicapped by its insufficiency, by virtue of being sourced from a single 6-inch hole, thus giving too narrow of a view. The interpreted seismic volumes, on the other hand, gives too broad of a view due to their imaging quality and resolution inadequacies. Even combining the two will not enable for the mapping of exact high permeability pathways.

The integration of available geological, geophysical, petrophysical engineering, and drilling data makes interesting inroads into the detection, mapping and predictive modeling of high permeability pathways. The final uncertainty of integrated models, however, can only be marginally better than the average uncertainty inherent in the various methods used. Mix and integrate as much as one may, the broad brush strokes on reservoir map deliverables, will remain just that: broad brush. A 0.5 mm scribble drawn on a 1:200,000 scale map to represent a fracture in the subsurface, is akin to depicting a fracture with an aperture of 200 m because of the width of the scribble relative to the scale of the map. The scribble will not reveal the precise path that the fluids are likely to take.

As oil fields mature, it can be expected that fluid injection for pressure support (secondary enhanced oil recovery) will increasingly tend to erratically invade, and irregularly sweep, the residual oil leg. At the close of the second millennium, petroleum concerns were seen scrambling to mobilize however possible in order to identify, detect and map pathways that may lead injected fluids prematurely updip along encroachment fingers. More often than not, the encroachment materializes faster than even the worst expectations, and commonly in quite unpredictable directions. Moreover, premature encroachment is commonly tortuous and will change direction in 3D volume, much like a rubber ball wildly bounced about in a cubic enclosure. This type of tortuousity renders high permeability pathway prediction almost impossible to satisfactorily pin down. In spite of an arsenal of cutting-edge technologies thrown at such problems, high permeability pathway prediction capability continues to suffer from high levels of uncertainty.

Post mortem and predictive mapping of erratically occurring high permeability pathways is a leading issue of concern to major petroleum companies. The solution to the problem is currently sought through the manipulation of data acquired directly from the borehole and indirectly, through map view representations of faults or fracture swarms or horizontal permeability ("kh") from pressure buildups. Permeability pathways are interwell phenomena. Unfortunately, it is interwell control that is very difficult to characterize.

With current technology, it is impossible to work out the exact pathway that fluid fingering takes as it invades deep into an oil leg, much less where it will go next. Engineering data (e.g. water arrival data—i.e., water arrival detected in an oil producing well, flowmeter data, test kh build-up, pressure data, and productivity/injectivity data), although mostly acquired at the borehole, are typically correlated aerially. The resultant maps are a very indirect, unreliable and a crude way of trying to depict the reservoir geology of a reservoir. The resultant maps are interpretive, and reservoir engineers are the first to dissociate them from being accurate reflections of specific geologic features. Moreover, the map resolutions are too broad to even remotely represent most geological features that would commonly be associated with high permeability pathways.

Other interwell methods to map permeability pathways are, likewise, handicapped by resolution problems. Geophysical technologies rooted in interpreting 3D, 4D, shear wave, or multi-component volumes; even when utilizing ever-developing clarity and resolution enhancing software packages, still only render a generalized mapping of a miniscule sampling of some faults in the general area where they may or may not be located.

In carbonate rocks, fractures with apertures measured in millimeters, or geobodies only centimeters across, can provide the necessary plumbing to take injected fluid past matrixed oil. To further illustrate this, a 3 cm wide fracture with no displacement may, under pressure, move fluids at several Darcies. These dimensions cannot be seen by current interpretive geophysical devices. Subsequently, the fault lines drawn on reservoir structure maps cannot be considered more than broad arrows pointing out a general direction; and not a depiction of actual permeability pathways. Furthermore, geophysically-interpreted data must be augmented by a solid understanding of the regional stress-strain regimes in order to filter out fracture swarms which may not be contributing to premature fluid breakthroughs.

Dyes and radioactive chemicals (tracers) introduced with injected fluids can be locally helpful, but they will not reveal the actual pathway taken by the host fluid from the entry well to the detection well. Borehole detection methods are the most exact, but they are also afflicted with major shortcomings. The immediately obvious shortcoming is that, for mapping purposes, wellsite data must be extrapolated and transformed into interwell information. Extrapolation in itself is the problem.

Any sedimentologist will sympathize with the deposition heterogeneities with or without a structural overprint. The slightest shifts in water depth, measured in decimeters, can create worlds of difference in depositional fabric. Moreover, rock minerals, especially carbonates, are in continuous "life long" effective diagenesis from the instant of deposition. There is no carbonate porosity that has not been dictated by deposition and then unceasingly altered by diagenesis. One can already see the problem of interwell extrapolation from well control.

The geostatistical distribution of attributes, including fractures detected on borehole image logs, at the wellbore, is the best we've got; but it is only statistical, and natural geological landscapes are too variable and rugose to respond comfortably to the smooth, clean logic of mathematics. Much like fingerprints, there are no two features in carbonate rocks that are the same. Extrapolation in the complex world of carbonate geology has a long way to go.

Adding to the difficulties of borehole solutions is that the geological features contributing to abnormally high flow rates are, like some rare species, rarely captured in rock cores. Consequently reservoir geologists are, in most cases, disallowed the opportunity to properly study and characterize reservoir problems.

SUMMARY OF THE INVENTION

A geophysical formation can include large rock formations. The rock formations are not solid (like metals), rather, they are a series of interconnected pores and pathways. Many of these pores and pathways are less than 1000 nanometers wide. The pores can contain a variety of fluids including oil, water, or natural gas.

It is desirable to know the contents and the structure of the pores. It is also important to understand the structures that permit high speed fluid flow through the formation. These "pathways" are important because water used to push the hydrocarbons through the formation, whether natural water-drive water or injected water, can flow from the water source, through the pathway to the wellbore, thus bypassing pockets of hydrocarbons.

Due to the depth of hydrocarbon bearing formations, often several thousand feet below ground, it is difficult to map a series of microscopic pores. Conventional devices for determining the contents of the formation, as shown in FIG. 1, are not effective for mapping the pore structure or learning the contents of the pores. One such method is surface seismic analysis, in which loud noises such as explosive charges are created near the surface, and an array of acoustic receivers 20 measure and record the reflected sound. Similarly, acoustic receivers 22 can be lowered into a wellbore 100 to record reflected sound. Neither of these seismic methods provide any detail about the pore structure nor the specific locations of the pores. Another method is to drill a wellbore 100 and remove core samples from the area drilled. The core samples are only a few inches wide and do not reveal the pathway structure for the entire geophysical formation.

A nanoscale robot, also referred to as a transmitter assembly, with a dimension smaller than 500 nanometers, could move through the pores to map the pore and pathway structure, find hydrocarbons within the structure, find water within the structure, and analyze the fluids, minerals, and rocks within the structure. The geophysical exploration nanorobots move through the hydrocarbon reservoir and, thus, may be called "Resbots"™.

One embodiment of a system to measure properties in a geophysical includes a wellbore lining in a wellbore, a plurality of fixed radio frequency receivers spaced apart along the longitudinal extent of and associated with the wellbore lining to receive radio frequency transmissions at one or more preselected radio frequencies, and a plurality of independent and untethered robots positioned within the geophysical formation. Each of the plurality of independent and untethered robots includes a robot body formed of a plurality of carbon nanotubes adapted to withstand temperatures exceeding 300 degrees Fahrenheit and being sized so that none of the length, width, or height of the robot body is greater than 500 nanometers, a sensor associated with the robot body and positioned to detect the presence of one or more hydrocarbons within the geophysical formation, a radio frequency transmitter associated with the robot body, positioned to transmit positional data and hydrocarbon characteristic data from the geophysical formation when the robot is positioned therein, and a power supply associated with the robot body to supply power to the transmitter and the sensor. These parts of the independent and untethered robot can collectively define a geophysical nanorobots. In this embodiment, the system also includes a machine in communication with each of the plurality of geophysical nanorobots, the machine including a processor, a display in communication with the processor, and a non-transitory, computer-readable storage medium with an executable program stored therein, wherein the program instructs the processor to perform the following steps: receiving positional data from one or more of the plurality of geophysical nanorobots, the positional data indicating the location of the geophysical nanorobots at a point in time; plotting, responsive to receipt of the positional data, at least one positional data point for one or more of the plurality of geophysical nanorobots to indicate a location of a cavity accessible by a geophysical nanorobots; receiving interior surface location data from one or more of the plurality of geophysical nanorobots, the interior surface location data defining a sensed three dimensional location of at least one point on an interior surface within the geophysical formation; combining the surface location data from the one or more of the plurality of geophysical nanorobots to create a representation of a physical map of at least a portion of the geophysical formation, the physical map indicating the three dimensional location of each of the plurality of sensed three dimensional locations within an interior surface of the geophysical formation; generating an interpolated map by projecting surfaces between a plurality of the points of the physical map, the interpolated map identifying a plurality of cavities in fluid communication with adjacent cavities; receiving fluid data from one or more of the plurality of geophysical nanorobots, the fluid data indicating the type and location of fluid located at each of a plurality of locations within the geophysical formation; and creating a fluid map on the display by plotting the type and location of fluids onto the interpolated map.

In another embodiment, the system includes a molecular processor associated with the robot body and responsive to the sensor to process detected hydrocarbon data from the sensor, and the radio frequency transmitter associated with the robot body is responsive to the molecular processor and positioned to transmit hydrocarbon characteristic data to one or more of the plurality of fixed radio frequency receivers.

In another embodiment, the system includes a geophysical nanorobot carrier adapted to carry and transport the plurality of geophysical nanorobots into the wellbore when positioned adjacent thereto, the geophysical nanorobot carrier being a wellbore lining having a plurality of perforations therein through which the plurality of geophysical robots pass when being inserted into the geophysical formation.

In another embodiment, at least one of the fixed radio frequency receivers is positioned to receive data from at least another one of the fixed radio frequency receivers when positioned in the geophysical formation and re-transmit the data from the at least another one of the fixed radio frequency receivers to the machine.

In another embodiment, each of the nanorobots also includes a propulsion device associated with each of the robot bodies to propel each of the plurality of geophysical nanorobots through pathways within the geophysical formation.

Another embodiment includes a plurality of fixed radio transmitters associated with the wellbore lining. Each of the plurality of geophysical nanorobots also includes a payload bay having a payload; and the geophysical nanorobot is positioned to release the payload in response to a signal from one of the plurality of fixed radio transmitters.

In another embodiment, the propulsion device of each of the plurality of geophysical nanorobots can include one or more of the following: a propeller, a flagella, a membrane, a crawler, and a Brownian motor. In another embodiment, the power supply of each of the plurality of geophysical nanorobots can derive energy from a fluid within the geophysical formation. In yet another embodiment, the power supply of each of the plurality of geophysical nanorobots can include one or more of the following: a fuel cell, wherein the fuel cell derives power from in-situ hydrocarbons; a thermoelectric power supply, wherein the heat of the fluid within the geophysical formation generates electricity; a piezoelectric generator, wherein the compressive forces acting on the piezoelectric generator generate electricity; an electromechanical nanoactuator responsive to movement of the fluid; and an ATPase catalyst, wherein the ATPase catalyst causes a chemical within the fluid to decompose and wherein energy is released when the chemical within the fluid decomposes. In another embodiment, the sensor can of each of the plurality of geophysical nanorobots can sense one or more of the following: fluid type, temperature, pressure, petrophysical property, geophysical nanorobot trajectory, and geophysical nanorobot position.

Another embodiment includes a plurality of fixed radio transmitters associated with the wellbore lining and each of the plurality of geophysical nanorobots also includes a nanorobot radio frequency receiver associated therewith; and one or more of the plurality of nanorobots propels in a direction different than a current trajectory in response to instructions from the machine transmitted via the plurality of fixed radio transmitters.

Another embodiment includes a battery charger associated with the wellbore lining which defines a downhole charging station; and each of the plurality of geophysical nanorobots also includes a carbon nanotube based battery located in the robot body. Each of the plurality of geophysical nanorobots can propel to the proximity of the downhole charging station and the downhole charging station charges each of the carbon nanotube based batteries.

Another embodiment includes a plurality of radio directional transmitters associated with the wellbore lining, each transmitting a beacon therefrom, wherein each of the plurality of geophysical nanorobots also includes a nanorobot radio frequency receiver, and wherein each of the plurality of geophysical nanorobots determines its position in response to signals from the plurality of radio direction beacons. In another embodiment, each of the plurality of geophysical nanorobots also includes a nanorobot radio frequency receiver, wherein one or more of the plurality of geophysical nanorobots is positioned to receive positional data from at least another one of the plurality of geophysical nanorobots and re-transmit the positional data from the at least another one of the plurality of geophysical nanorobots.

In another embodiment, the surface location data includes the location of a point wherein one of the plurality of geophysical nanorobots contacted a surface within the geophysical formation. In another embodiment, the surface location data includes multiple location points from non-contact sensors. In another embodiment, the non-contact sensors include an ultrasonic sensor or a radio frequency sensor, or both, located on the geophysical nanorobots.

In another embodiment, the program further instructs the processor to perform the step of interpolating fluid data to identify a three-dimensional region filled with a homogenous fluid to define a fluid pocket within the geophysical formation. In another embodiment, the program also instructs the processor to perform the step of identifying a plurality of cavities in communication with one another, each cavity having a cross-sectional area greater than a predetermined value, to define a pathway.

In another embodiment, the program also instructs the processor to perform the step of identifying a pocket having a homogenous hydrocarbon that is generally surrounded by a fluid that is different than the homogenous hydrocarbon to define a hydrocarbon pocket within the geophysical formation. In another embodiment, the program also instructs the processor to perform the step of causing at least one of the plurality of geophysical nanorobots to move to a location different than its current location.

One embodiment of a technique to identify properties of a geophysical formation includes steps of: communicating, to a machine, the machine including a processor, a display in communication with the processor, and a non-transitory, computer-readable storage medium with an executable program stored therein, interior surface location data of the geophysical formation from a plurality of geophysical robots, the interior surface location data defining a sensed three dimensional location of at least one point on each of a plurality of interior surfaces within the geophysical formation; generating an interpolated map on the machine, responsive to the interior surface location data, by projecting surfaces between representations of the at least one points on each of the plurality of interior surfaces of the geophysical formation, the interpolated map identifying a physical shape and a location of a plurality of surfaces in the geophysical formation; communicating, to the machine, fluid data responsive to a sensor located on each of the one or more of the plurality of geophysical robots, the fluid data indicating the type and location of fluid located at each of a plurality of locations within the geophysical formation; and creating a fluid map on the machine by plotting the type and location of fluids onto the interpolated map of the geophysical formation so that physical representation of fluids within the geophysical formation are displayed on the machine.

In another embodiment, the technique includes interpolating, by the machine, the fluid data to identify a three-dimensional region filled with a homogenous fluid to define a fluid pocket within the geophysical formation. In another embodiment, the technique includes identifying, by the machine, a plurality of cavities in communication with one another, each cavity having a cross-sectional area greater than a predetermined value, to define a pathway.

In another embodiment of the technique, the plurality of geophysical robots include a nanorobot defined as having: a robot body formed of a plurality of carbon nanotubes adapted to withstand temperatures exceeding 300 degrees Fahrenheit and being sized so that none of the length, width, or height of the robot body is greater than 500 nanometers, a hydrocarbon sensor associated with the robot body and positioned to detect the presence of one or more hydrocarbons within the geophysical formation, a radio frequency receiver associated with the robot body, positioned to receive radio frequency transmissions, a radio frequency transmitter associated with the robot body, positioned to transmit positional data and hydrocarbon characteristic data from the geophysical formation when the robot is positioned therein, and a power supply associated with the robot body to supply power to the receiver, the transmitter, and the sensor.

In another embodiment, the communicating step of the technique includes transmitting, via a radio frequency transmitter associated with the robot body, to a fixed radio frequency receiver located in a wellbore. In another embodiment, the communicating step of the technique includes transmitting data, via a fixed radio frequency transmitter associated with a wellbore, to a fixed radio frequency receiver associated with the wellbore and further communicating the data to the machine.

In another embodiment, a system to measure properties in a geophysical formation includes a plurality of wellbore linings each being positioned in a separate and different one of a plurality of wellbores extending into a geophysical formation. It also includes a plurality of fixed radio frequency transmitters spaced apart along the longitudinal extent of and associated with one or more of the plurality of wellbore linings to transmit radio frequency signals at one or more preselected radio frequencies and a plurality of independent and untethered robots positioned within the geophysical formation. Each of the plurality of independent and untethered robots can include a robot body having a diameter no greater than 1000 nanometers, formed of a plurality of carbon nanotubes adapted to withstand temperatures exceeding 300 degrees Fahrenheit, and a radio frequency identification tag positioned to transmit a signal responsive to the one or more preselected radio frequency signal transmitted by one or more of the plurality of fixed transmitters. Thus, the plurality of independent and untethered robots can collectively define a plurality of geophysical nanorobots. The system can also inlcude a plurality of fixed radio frequency receivers positioned spaced apart along the longitudinal extent of and associated with one or more of the plurality of wellbore linings to receive radio frequency signals at one or more preselected radio frequencies, a machine in communication with each of the plurality of geophysical nanorobots, the machine including a processor, a display in communication with the processor, and a non-transitory, computer-readable storage medium with an executable program stored therein. The program product can instruct the processor to perform the following steps: receiving positional data from one or more of the plurality of geophysical nanorobots, the positional data indicating the location of the geophysical nanorobots at a point in time; plotting, responsive to receipt of the positional data, at least one positional data point for a portion the plurality of geophysical nanorobots to indicate a location of a cavity accessible by one of the plurality of geophysical nanorobots; and combining the positional data points of a portion of the plurality of geophysical nanorobots to create a representation of a physical map of at least a portion of the geophysical formation, the physical map indicating the three-dimensional location of each cavity of the geophysical formation accessible by one of the plurality of nanorobots.

In another embodiment, each of the plurality of geophysical nanorobots has a substantially spherical shape and the program further instructs the processor to perform the steps of: identifying a plurality of cavities in communication with one another, each cavity having a cross-sectional area located between outer walls of the cavity, transverse to a travel path of the geophysical nanorobot, greater than a predetermined value, to define a pathway responsive to the three-dimensional location of each cavity indicated on the physical map. The program can instruct the computer to cause a portion of the plurality of geophysical nanorobots, located within the pathway, to release the payload contained therein within the pathway.

In another embodiment, the body of each of the plurality of geophysical nanorobots has a substantially spherical shape and the plurality of geophysical nanorobots also has a plurality of different sized diameters. The program further instructs the processor to perform the step of identifying a location within the formation accessible to a first set of the plurality of geophysical nanorobots having one of the different sized diameters, not readily accessible to a second set of geophysical nanorobots having another one of the different sized diameters.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the attached drawings, which drawings form a part of this specification. It is to be noted, however, that the drawings illustrate only a preferred embodiment of the invention and therefore should not be considered limiting of its scope as the invention may admit to other equally effective embodiments.

FIG. 14 is an environmental sectional view of a plurality of different sized geophysical nanorobots, each having a spherical shape and a radio frequency identification tag, located in pathways in a geophysical formation according to another embodiment of the present invention.

FIG. 16 is a partial sectional view of a carrier inserting a plurality of geophysical nanorobots to pass through perforations in wellbore casing of a wellbore according to another embodiment of the present invention.

FIG. 18 is a sectional view of the casing of the geophysical exploration system of FIG. 2 according to an embodiment of the present invention.

DETAILED DESCRIPTION OF THE PREFERRED EMBODIMENT

The present invention will now be described more fully hereinafter with reference to the accompanying drawings which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout, and the prime notation, if used, indicates similar elements in alternative embodiments.

Figure 1:
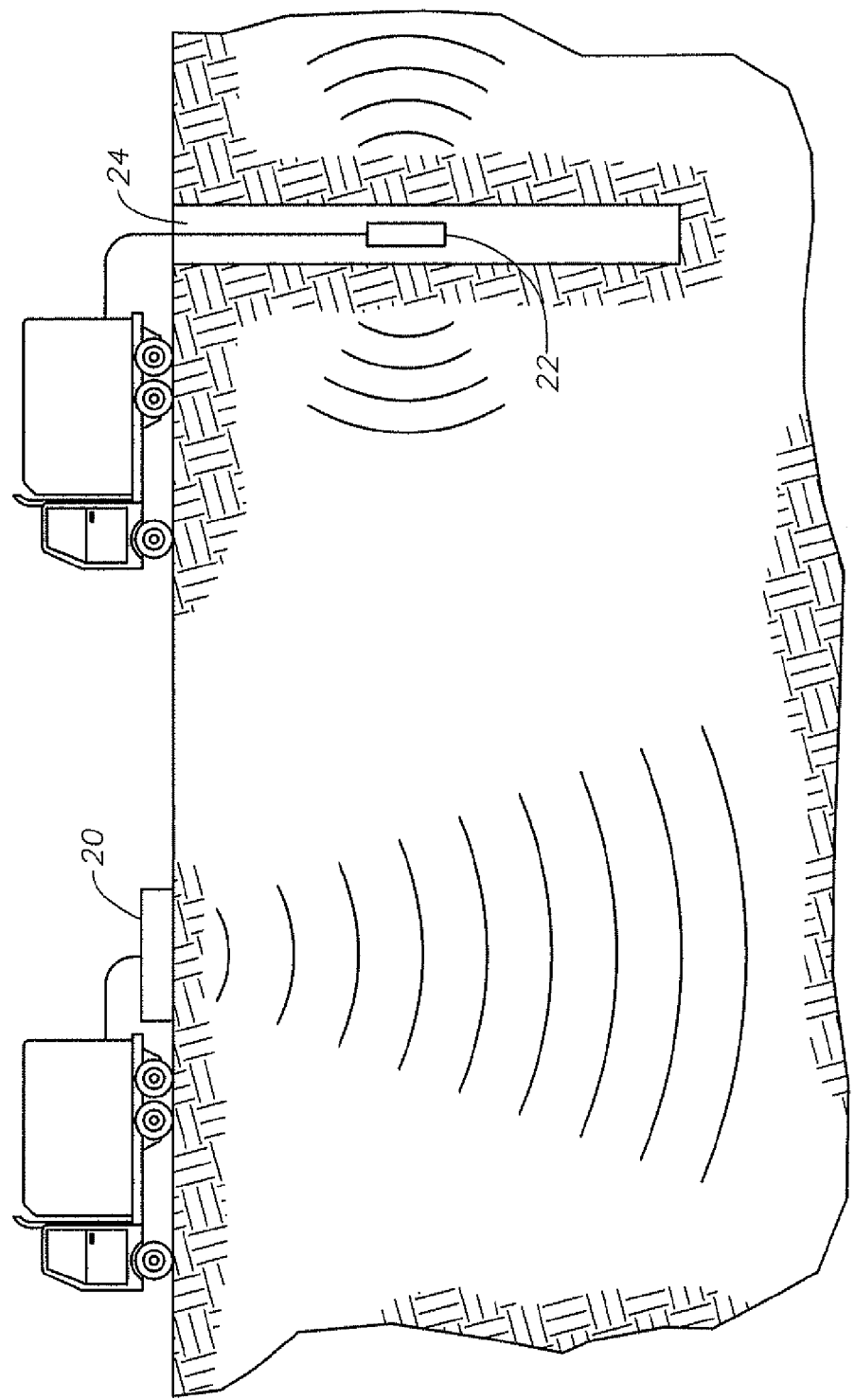
FIG. 1 is a partial sectional view of surface and downhole seismic mapping operations according to the prior art.
Figure 2:
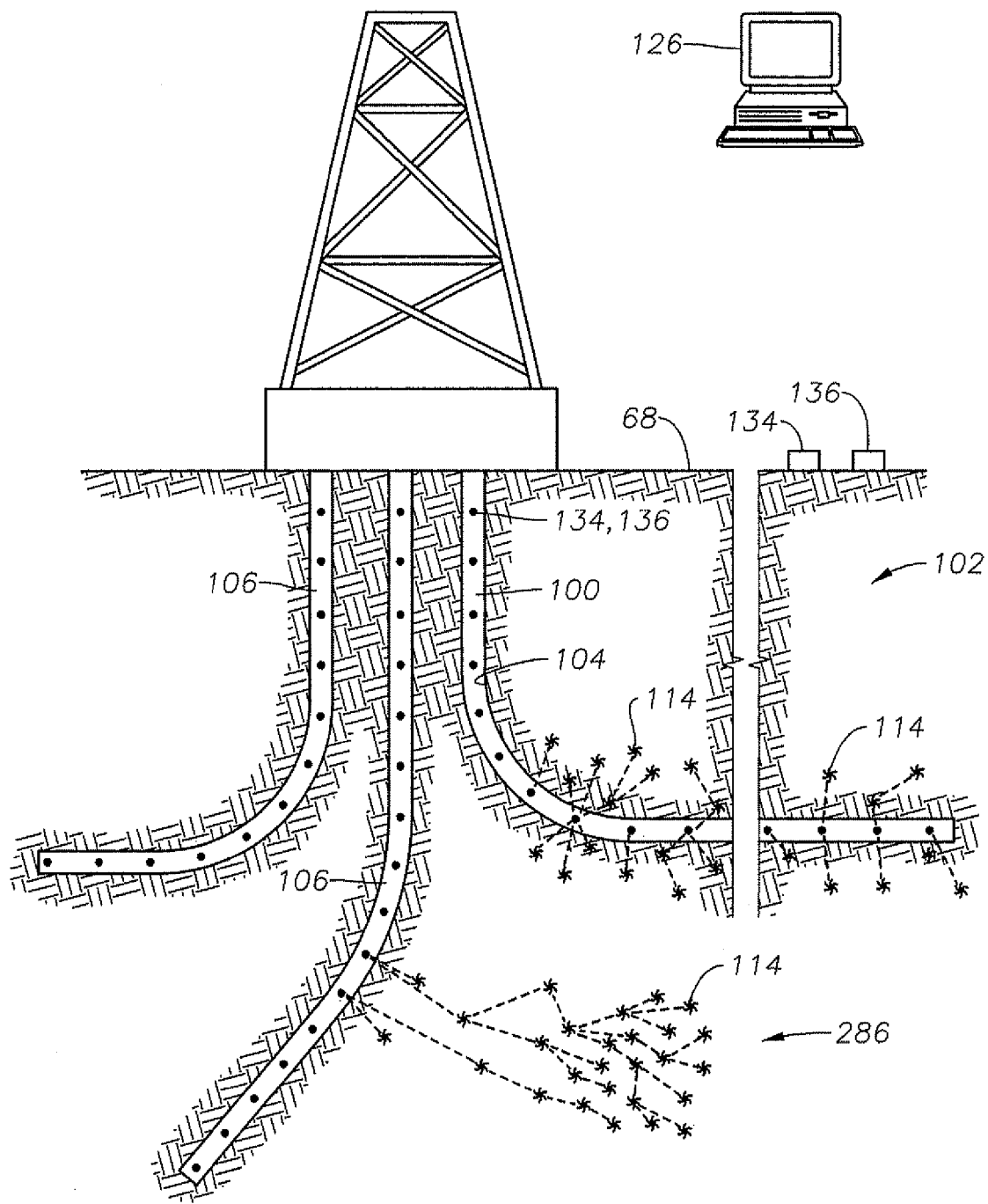
FIG. 2 is a partial sectional view of a geophysical nanorobot based geophysical exploration system according to an embodiment of the present invention.
Figure 3:
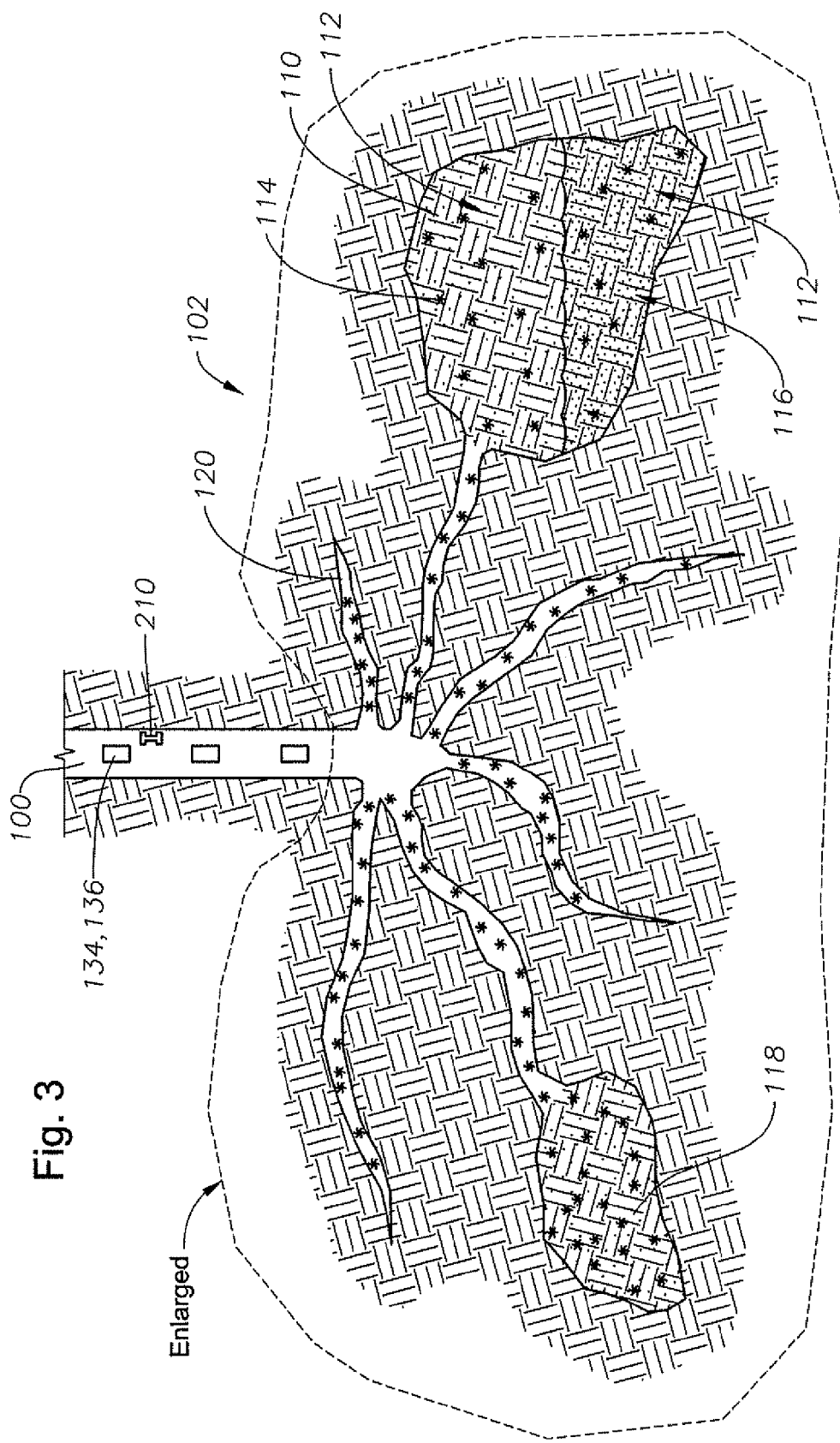
FIG. 3 is an enlarged sectional view of a wellbore in a geophysical formation having a plurality of geophysical nanorobots deployed through fissures, pathways, and porous rock structures according to still another embodiment of the present invention.
Figure 15:
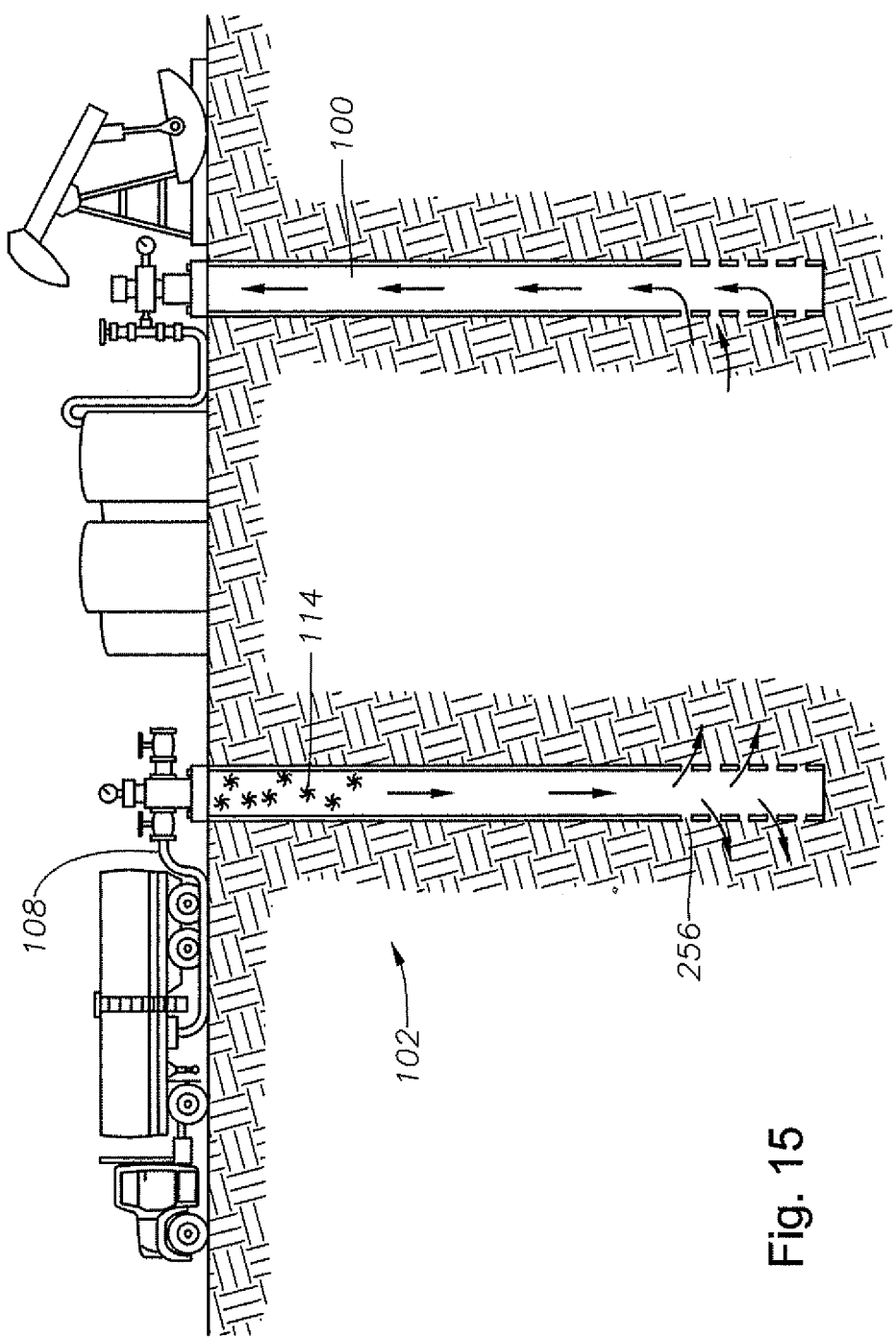
FIG. 15 is an environmental sectional view of a system having a plurality of geophysical nanorobots that are injected with secondary recovery pressurized water according to another embodiment of the present invention.

One or more wellbores 100 are drilled 510 into a geophysical formation 102 (hereinafter "geophysical formation," "formation," or "rock"), as shown in FIGS. 2 and 3. A wellbore 100 can be an exploratory well used to locate hydrocarbons 110 such as oil or gas 116, water, or other fluids 112. The term "fluids" refers to any type of gas or liquid fluid, including water, hydrocarbons, and gas. If desirable fluids are found, a wellbore 100 can be completed as a production well. Wellbore completion frequently includes lining 512 the wellbore with a wellbore lining such as, for example, casing 104, which is generally a metallic pipe or tube. The casing 104 can be cemented in place. Additional production wells 106 can be drilled in the same geophysical formation. Wellbores can also be used for secondary recovery operations (FIG. 15). In a secondary or tertiary recovery operation, an injection fluid 108 such as water, steam, carbon dioxide, or chemicals are injected, under pressure, into the geophysical formation 102. The injection fluid serves as a drive mechanism to push the well fluids out through a production well 100. The production or injection well can be used to insert nanorobots into the geophysical formation.

Figure 4:
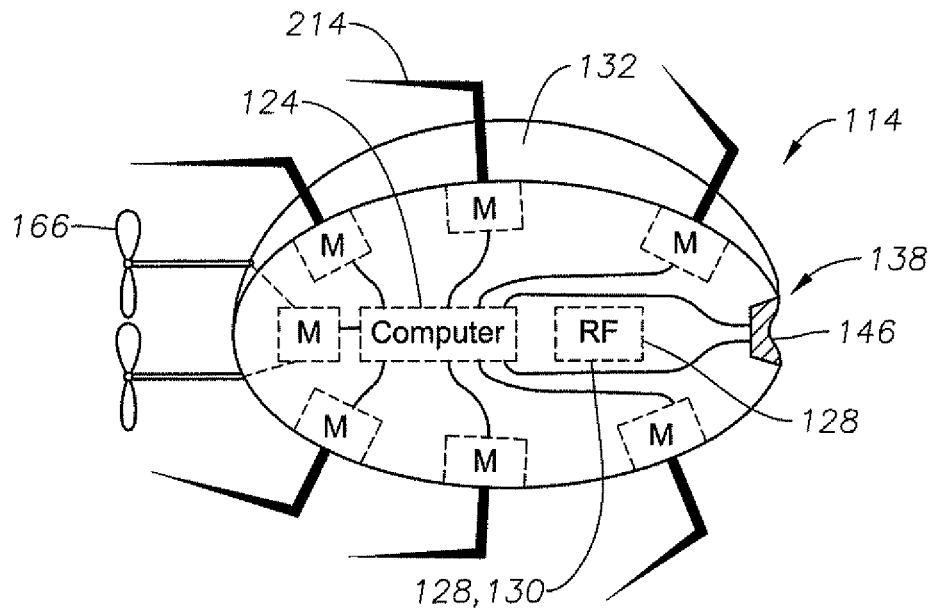
FIG. 4 is a sectional view of a geophysical nanorobot having multiple propulsion devices, a processor, a radio frequency transmitter, and a sensor according to yet another embodiment of the present invention.

A geophysical nanorobot 114, or "Resbot™," is a nanoscale probe that is able to travel deep within underground rock strata along pathways permeable to fluids and transmit back and/or collect data that can be used to map and characterize the pathways. In the instant specification, the term "robot" means a mechanical device that is capable of performing one or more tasks on command or by being programmed in advance; a machine or device that can be operated by remote control or automatically. A nanorobot, thus, is a robot on a nano scale. In an exemplary embodiment, the nanorobots have at least one dimension less than 500 nanometers. Individual components in a nanorobot 114 can generally have dimensions of 1 to 100 nanometers. In some embodiments, all of the dimensions (length, width, height) are less than 500 nanometers. One nanometer (nm) is one billionth, or $10^{-9}$, of a meter. An exemplary embodiment of a nanorobot 114 is shown in FIG. 4. The nanorobots 114 are small enough to fit through the pathways, pores, and fissures in the formations.

As shown in FIG. 3, the geophysical nanorobots 114 travel through cavities 118, which includes pores and pathways 120, within the geophysical formation 102. The cavities 118 depicted in FIG. 3 are enlarged to show detail. The pores and pathways inside the oil bearing rocks are very small, typically less than 1000 nanometers. A pathway 120 can also be is less than 1000 nanometers wide, but could be larger than 1000 nanometers wide. A nanorobot with a dimension less than 500 nm can fit through most of the pores and pathways within the formation.

Figure 21:
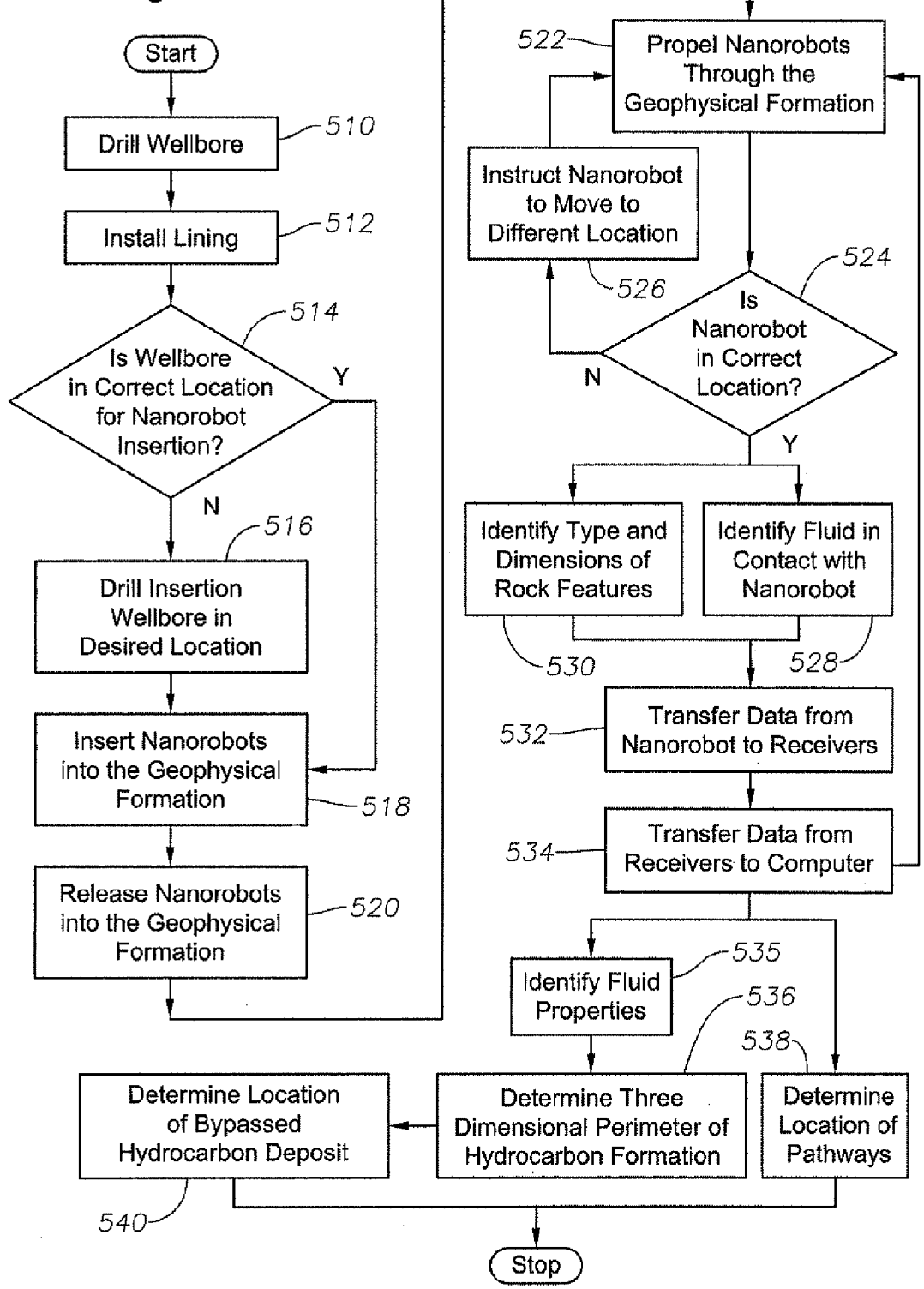
FIG. 21 is a flowchart of a nanorobot based geophysical mapping operation according to an embodiment of the present invention.

The nanorobots 114, are deployed 518 into the geophysical formation 102 (rock formation) to map the formation, find fluids 110 such as hydrocarbons 110, find bypassed pockets of fluids, water 116, mineral solids, and voids. Once in the cavity 118 system of the targeted host rock, the nanorobot 114 is propelled 522 along with the natural flow of the fluid medium within which it is traveling, and, in some embodiments, it as also able to thrust itself along using its own power. If the nanorobot is in the desired location to be mapped 524, it will proceed with its analysis. In one embodiment, if the nanorobot is not in the correct location 524, an onboard controller 124 or above ground nanorobot control computer 126 can instruct the nanorobot to move to a different location 526. The nanorobot 114 can communicate with the control computer 126 by using an onboard transmitter 128 and receiver 130. The nanorobot can communicate with the control computer by sending and receiving data through fixed receivers 134 and transmitters 136 located in the wellbore 100, on the surface, or embedded in the geophysical formation 102. The nanorobot 114 uses sensors 138 to identify 528 and describe the fluids 112 it comes in contact with. The nanorobot 114 also supports characterizing rock formations, by measuring 530 dimensions and locations of subterranean features, including the size of cavities 118 and the pathways 120 formed by interconnected cavities 118. The overall process for the insertion, deployment, control, data transmission, and analysis is shown in FIG. 21, and referenced throughout this document. A more detailed description of this geophysical nanorobot exploration system follows.

As illustrated in FIGS. 4-14, the nanorobots 114 can have sensors 138 and an onboard computer 124. The onboard computer 124 controls the actions of the nanorobot 114 and can record data regarding the nanorobot's position and sensor 138 readings. In some embodiments, the nanorobot 114 is able to determine its coordinates and calculate its velocity at any given time. Some nanorobots have transmitters 128 for sending information and receivers 130 for receiving information. Some embodiments have a payload bay 140 and can deliver a payload 142, such as a surfactant, to a location within the geophysical formation. In some nanorobots, the receiver 130 can receive data signals from fixed transmitters 136 or from other nanorobots 114. Furthermore, the receiver 130, or another receiver, can detect radio frequency or ultrasonic signals. Each of these components will be described in greater detail. The nanorobots 114 can operate independently and without being tethered to any other component.

Figure 6:
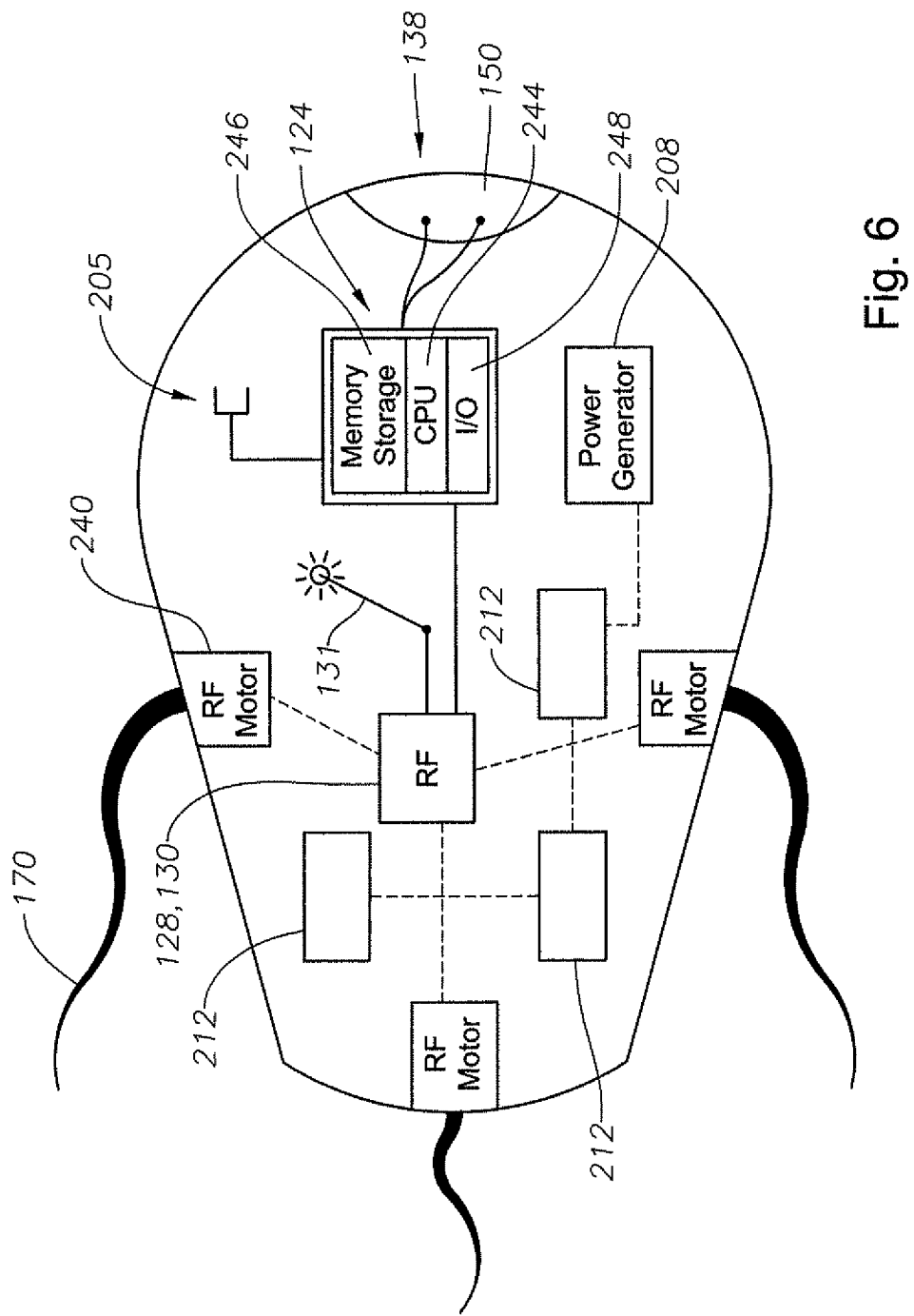
FIG. 6 is a partial sectional view of a geophysical nanorobot having a radio frequency transmitter and a vibration sensor according to yet another embodiment of the present invention.

The nanorobot is housed in a body 132 or shell, as shown in FIG. 4. The body is adherence-resistant and can be generally spherical (FIG. 14) or capsule-shaped, but could be other shapes. The body 132 can have a tapered shape, as shown in FIG. 6, or a cylindrical shape, as shown in FIGS. 8A-8D. The adherence resistance, among other things, prevents the viscous formation fluids from adhering to the nanorobot. The body 132 can be hermetically sealed to protect the components inside the body 132 from wellbore fluids 112. The body 132 houses the elements of the nanorobot and can serve as a frame for the elements. The body can be made of any material that is suitable to the small scale of the nanorobot and that provides the required protection from the intended operating environment. The body material can be based upon, for example, carbon nanotubes ("CNT") or Boron-Nitride. The carbon nanotubes can be bonded or otherwise fused together to form the body. The nanorobot 114 can encounter temperatures in excess of 300 degrees Fahrenheit. The body 132 is able to withstand temperatures in excess of 300 degrees and serve as a thermal protection shield for the other components of the nanorobot. The body 132, thus, allows the nanorobot to operate in environments in excess of 300 degrees Fahrenheit.

In one embodiment, shown in FIG. 14, a nanorobot 115 has a spherical shape. In one embodiment, nanorobot 115 has a reactive identification tag 133 that responds to an external signal. A wellbore fixed transmitter 136, for example, could emit a signal that causes reactive identification tag 133 to emit a different signal, and the different signal can be received by one or more wellbore fixed receivers 134. The reactive identification tag 133 could be, for example, a radio frequency identification tag that emits a unique radio frequency in response to receiving a radio frequency. In one embodiment, the reactive identification tag 133 includes magnetic particles. The magnetic particles respond to electromagnetic energy emitted by the wellbore fixed transmitters 136, and the presence of the magnetic particles is detected by wellbore fixed receivers 134. In one embodiment, nanorobots 115 have different sizes. Some could have a diameter, for example, less than 500 nanometers, and some could have a diameter, for example, of 750 nanometers or 1000 nanometers.

As illustrated in FIGS. 4-14, the nanorobot 114 has one or more sensors 138 for sensing its environment. In an exemplary embodiment, the nanorobot 114 has positional sensors that indicate its position within the rock formation, including its vertical position. The positional sensor, or data from the positional sensor, can also detect the nanorobot's 114 velocity as it moves through the formation. In some embodiments, an onboard computer 124 uses positional information to calculate velocity and/or trajectory of the nanorobot 114. In other embodiments, the onboard computer 124 can use data from directional and velocity sensors to calculate position. In some embodiments, the positional sensors can use external signals such as directional radio frequency beacons to determine the position.

The nanorobot sensor 138 can include chemical and gas sensors and can be carbon nano tube ("CNT") based. The chemical and gas sensors are capable of determining the composition of rocks and fluids. The onboard computer 124, such as a nano-computer or molecular computer, can be used to interpret sensor data and identify elements. In some embodiments, the raw sensor data is transmitted to the wellbore receiver and sent to a nanorobot control computer 126 for interpretation.

Figure 7:
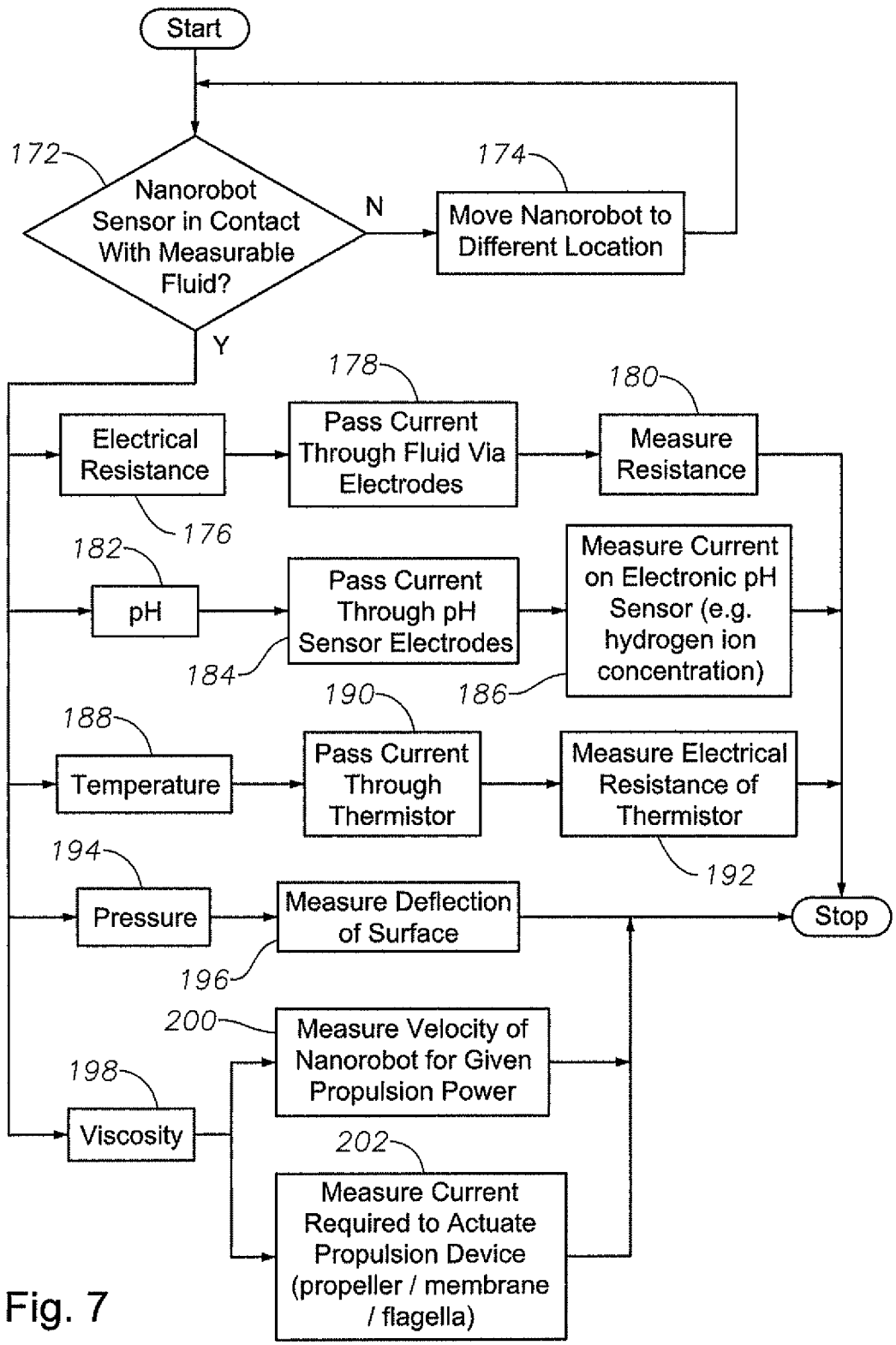
FIG. 7 is a flowchart of operational identification of fluid properties responsive to a plurality of geophysical nanorobots according to another embodiment of the present invention.

The sensor 138 can include a fluid properties sensor and, thus, can sense fluid properties including the presence of a fluid, fluid type, temperature, pressure, and viscosity 528. In some embodiments, the fluid sensor can identify the presence of a hydrocarbon, identify the type of hydrocarbon, or identify a particular liquid. Furthermore, in one embodiment, the fluid type sensor can detect the presence and type of natural water drive fluids, injection fluids, and other fluids that may be present in the rock formation. The fluid data can also indicate fluid saturation within the geophysical formation. In one embodiment, sensor 138 includes ligands that are chemically reactive to, for example, different fluid types, salinity, pH, and temperature. FIG. 7 is a flow chart showing examples of techniques to determine fluid properties using sensors 138 on a nanorobot. The steps of FIG. 7 are referred to throughout the discussion of sensors.

The nanorobot 124 must be in contact with a fluid 172. If it is not, the onboard computer 124 or control computer 126 can direct the nanorobot 114 to a different location 174. In one embodiment, as shown in FIG. 4, the sensor 138 includes electrodes 146, 176 for determining fluid properties. Electric current can be passed between the electrodes 178. The amount of resistance provided by the fluid can indicate the presence of a fluid and the fluid type 180. Similarly, the resistance 192 from a thermistor 148 (FIG. 5) can indicate the temperature 188 of a fluid in contact with the nanorobot 114, 190. The electrodes 146 and thermistor 148 can be connected to the onboard computer 124. The electrodes 146 can also be part of a pH sensor 182 for determining the pH of fluids. Electric current can be passed through the fluid between pH sensor electrodes 184, and the amount of current passed through the fluid can indicate the hydrogen ion concentration in the fluid 186 and, thus, indicate the pH of the fluid.

In one embodiment, the nanorobot 114 includes a laboratory on a chip ("LOC") 150 (FIG. 6). The LOC 150, also known as a "micro-total-analysis-system," integrates several chemical or bio-chemical analysis steps on a single chip, wherein the chip is small enough to fit inside a nanorobot. LOC analysis could include, for example, measurement of reservoir (dynamic) fluid properties, production allocation, formation stresses, pressures and borehole stability, formation damage assessment, mud rheology and mud logging, and formation evaluation. LOC analysis can also determine whether water is potable. LOC 150 may include ligands.

In some embodiments, one of the sensors 138 can include a nano camera to record and ultimately transmit images from inside the formation. Other sensors can include a pressure sensor or a viscosity sensor. For example, the deflection of a pressure sensor 204 (FIG. 8A) can be measured 196 to determine the pressure of the fluid. The viscosity 198 of a fluid can be measured by measuring the velocity of the nanorobot and comparing the velocity to the required propulsion power 200. Indeed, propulsion components, including, for example, propellers 166, vibrating membranes 168, and flagella 170 can also be used to determine several fluid properties. For example, the current required to drive any of the propulsion devices can be indicators of viscosity 202. Furthermore, the resistance encountered by the vibrating membrane 168 can be an indicator of pressure.

In some embodiments, the sensor 138 includes a rock composition sensor that is able to determine the type of rock in contact with the nanorobot. The sensor can also determine, for example, the relative permeability, pore throat size, porosity, permeability, and mineral structure of the rocks 530. Other rock characteristics can also be measured. For example, sensors 138 on the nanorobot 114 can include sensors to measure physical dimensions such as the aperture of a cavity 118, or pore, in a rock formation. A variety of sensors could be used including, for example, positional, contact sensors, and non-contact sensors. Porosity, relative permeability, and mineral structure of the geophysical formation 102 can be determined from sensed data.

Figure 11A:
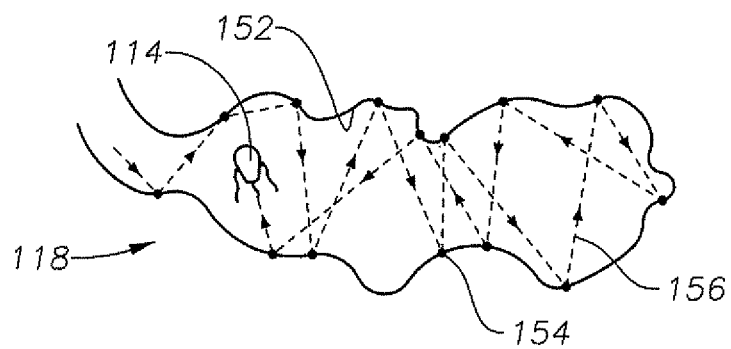
FIG. 11A is a sectional view of a geophysical nanorobot performing contact mapping according to yet another embodiment of the present invention.
Figure 11B:
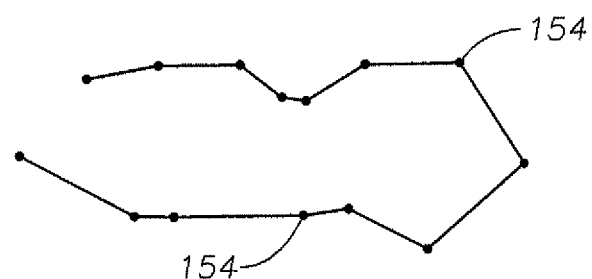
FIG. 11B is a depiction of a map developed from the contact mapping of FIG. 11A according to yet another embodiment of the present invention.

In some embodiments, the pore width is measured by recording the position of the nanorobot as it moves across the diameter of the pore 118 along a path 156 (see FIG. 11A). The path 156 can be random or deliberate movements within the pore 118. The surfaces 152 of the pore are identified each time the nanorobot contacts the surface 152 at a point 154. The relative locations of the points 154 can be stored in the memory of the nanorobot computer 124, or can be transferred to the control computer 126 for analysis. FIG. 11B shows a plot that can be created from the contact points 154 of the nanorobot. Each point 154 is plotted relative to the other known contact points 154. The aperture or pore size can be calculated from the distance between the contact points 154, and the overall cross-sectional area of the pore can be calculated from the known points. The positional data of the nanorobot, thus, is analyzed to determine the physical dimensions of the pore 118. In some embodiments, the nanorobot sensor 138 can detect contact with the rock to determine each contact point. In other embodiments, the nanorobot 114 is propelled through the pore and stops or changes directions each time it contacts a surface in the pore. The location of the nanorobot 114 is recorded each time it stops or changes direction to identify the contact point 154. In one embodiment, the mere presence of the nanorobot 114 can act as a sensor. By determining the location of the nanorobot, the computer 126 can determine that the robot is in a pathway that has a diameter or cross-section that is at least as large as the nanorobot. Thus, the pathways can be mapped even if the precise location of surfaces defining the pathway are not known. Furthermore, the locations of surfaces defining the pathway can be approximated from the locations of the nanorobots 114.

Figure 12:
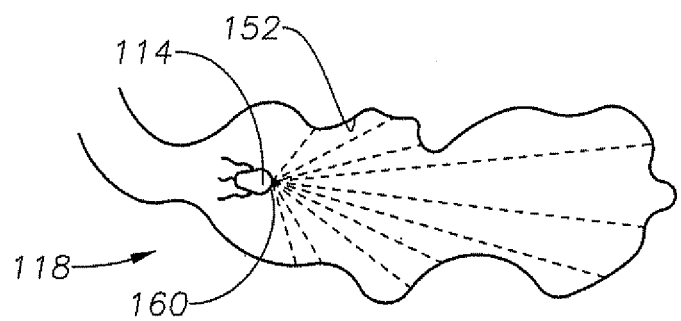
FIG. 12 is a sectional view of a geophysical nanorobot performing non-contact mapping according to yet another embodiment of the present invention.

The features of a rock formation can also be measured by an ultrasonic sensor 158 (FIG. 8C), wherein the sensor emits an ultrasonic frequency and then interprets the signals reflected back to the nanorobot 114, as shown in FIG. 12. Similarly, a radio frequency generator 160 on the nanorobot 114 can emit a radio frequency 162 that is reflected by the surface 152 of the formation back to the nanorobot. The ultrasonic or radio frequency sensor each allows the nanorobot to map geological features in its immediate area without directly contacting each geological feature. In some embodiments, the radio frequency generator used for non-contact surface mapping can share components with the radio frequency transmitter 136 used for communication.

Figure 5:
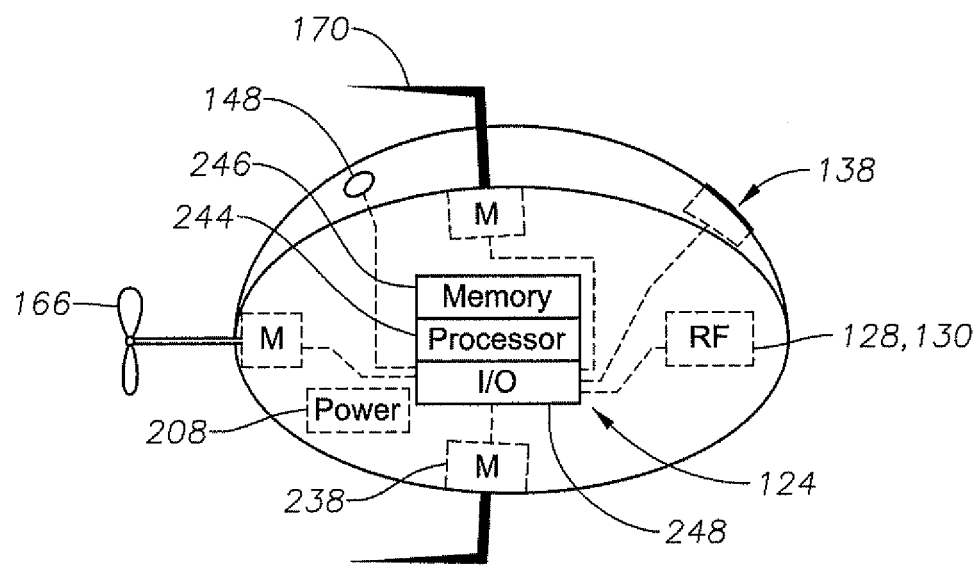
FIG. 5 is a partial sectional view of a geophysical nanorobot having a nano-processor control system according to yet another embodiment of the present invention.

In one embodiment, the nanorobot 114 has position sensors for determining its own position or movement. For example, vibration sensor 205 can determine vibrations associated with movement and, thus determine the velocity and direction of movement of the nanorobot 114 (FIG. 5). Other motion or position sensors 206, such as, for example, a nano-sized accelerometer, can be used to determine the location or relative movement of the nanorobot 114 within the formation.

Figure 9:
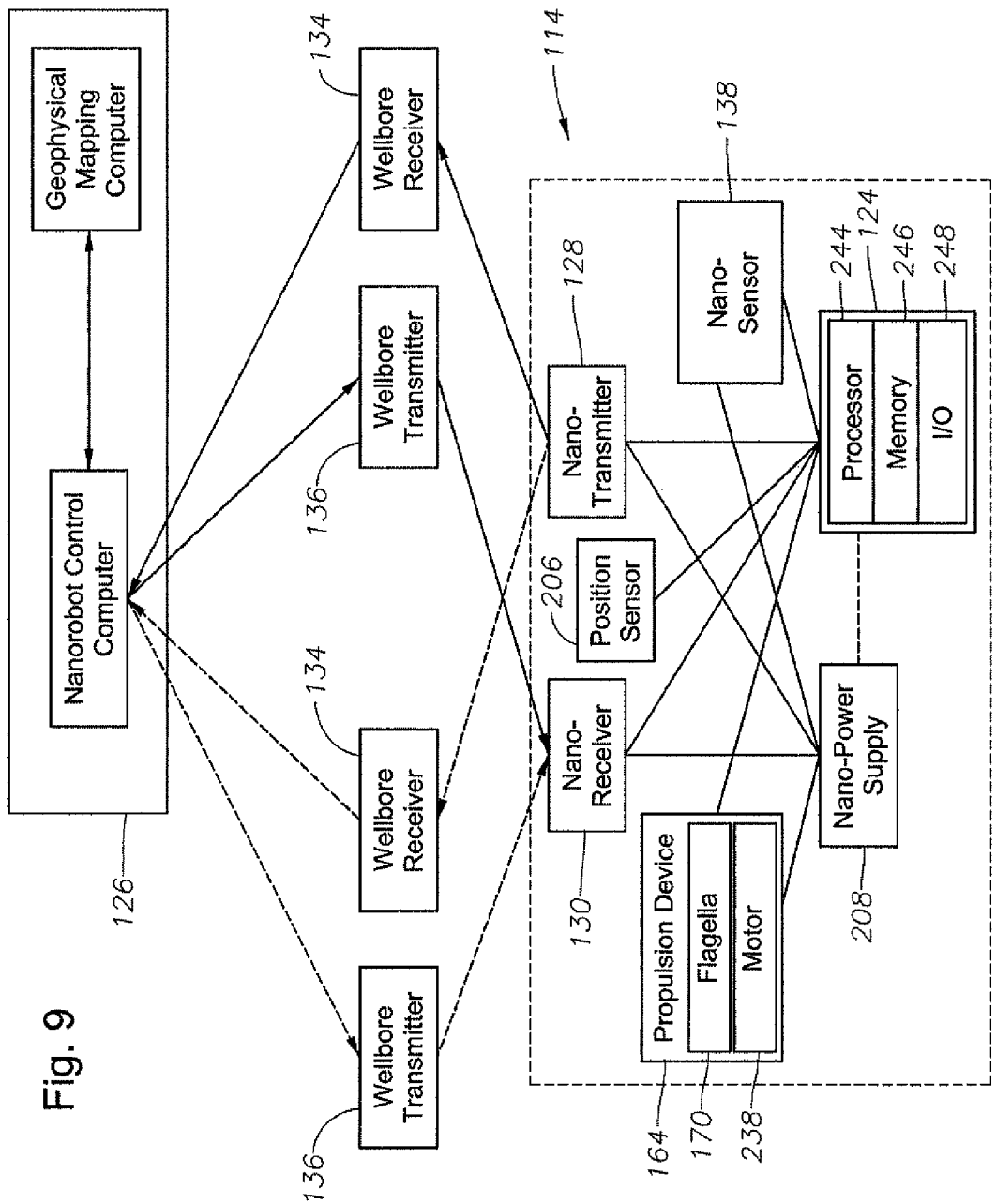
FIG. 9 is a functional block diagram of a geophysical nanorobot based geographical exploration system according to an embodiment of the present invention.

The nanorobot can require power to perform its tasks. Some embodiments, however, do not require a power supply or power source to be located on or in the nanorobot 114. For embodiments that require power, numerous power sources are available to power the nanorobot 114, examples of which are illustrated in FIGS. 5, 6, and 9. Various types of power supplies 208 can capture power from these power sources. For example, power can come from thermoelectric power created by the high temperatures of the subterranean environment. Power can also come from piezoelectric generators, which generate power in response to compression or vibration of a surface. The piezoelectric generator can include a crystal that gains an electrical charge when a force is applied to the crystal. Well fluid can cause the piezoelectric generator to vibrate and thus create electricity to power the nanorobot. Furthermore, the same crystal can vibrate in response to an electric charge applied to the crystal. The vibration may be sufficient to give off an ultrasonic signal, which could be used to drive a propulsion device. Therefore, stored power in the nanorobot could be used to provide power and thus the single piezoelectric generator can provide both electricity and propulsion for a nanorobot.

Similarly, fluid movement in the vicinity of the nanorobot 114 can cause an electromechanical nanoactuator to move and thus generate electricity. In another embodiment, power is generated by CNT based fuel-cells. The fuel-cells generate power from in-situ hydrocarbon. Some power can be produced by friction with rock surfaces. In some embodiments, ATPases are used to power or partially power some sensors. An ATPase is a class of enzymes that catalyze the decomposition of various chemicals, causing the chemicals to release energy as they decompose.

Figure 17:
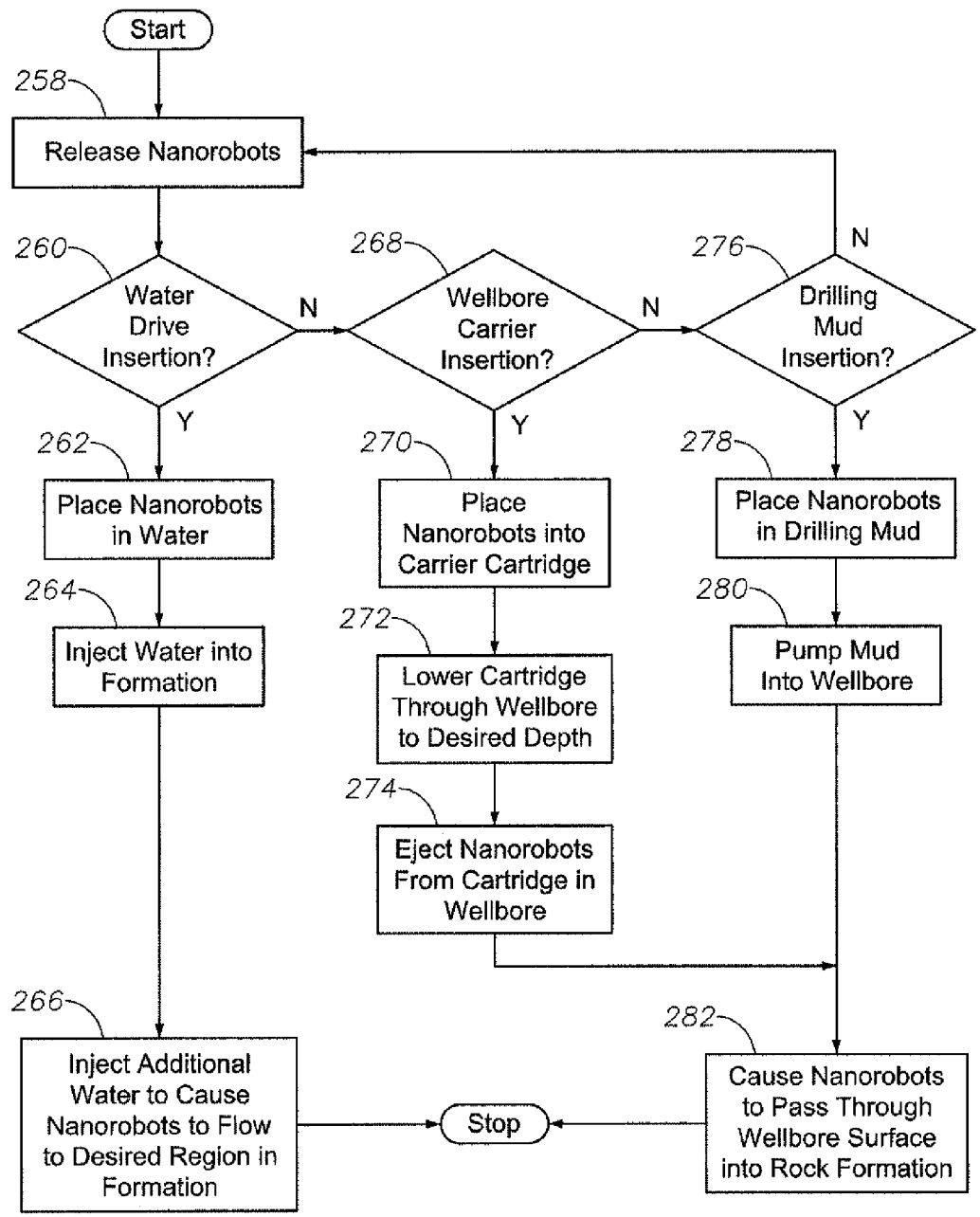
FIG. 17 is a flowchart of operational insertion of a plurality of geophysical nanorobots into a geophysical formation according to another embodiment of the present invention.

Power from these various power supplies 208 can be stored in batteries 212 such as, for example, CNT-based batteries. Furthermore, power can be stored in batteries prior to inserting the nanorobots 114 into the ground. In one embodiment, nanorobots are able to recharge at a downhole charging station 210 (FIG. 17). The downhole charging station could be, for example, a battery charger located in or on the casing 104 in the wellbore 100. The nanorobots 114 can propel themselves or be propelled to the charging station 210. In this embodiment, the power supply 208 receives electrical power from the charging station 210. The power supply can operate by contact or non-contact techniques. After the power supply 208 recharges the battery 212 or batteries 212, the nanorobot 114 can move away from the power station 210 to continue its task.

Various propulsion devices 164, as shown in FIGS. 4-10, can be used to propel nanorobots through the rock formation. The nanorobot 114 is able to move through pores 118 within the formation without becoming stuck inside the pore (and thus blocking fluid flow through the pore). Some of the propulsion devices are able to move the nanorobot through the rock formation even when not aided by downhole fluid flow. Furthermore, the propulsion devices are able to overcome the viscous and gravitational forces present within the formation. Some of the propulsion devices can propel the nanorobot at a practical speed against the reservoir fluid flow. Finally, the propulsion devices are able to propel the nanorobot in any direction, including changing direction laterally and vertically.

The simplest propulsion device is a fluid-flow device, wherein fluids 112 within the rock formation 102 propel the nanorobot. In this embodiment, the nanorobots are injected into the reservoir with normal injection water, as shown in FIG. 15. As the water 116 pushes hydrocarbons through the pores and pathways within the formation, the nanorobots 114 move with the water and hydrocarbons. The nanorobots in this embodiment can have any shape, including, for example, a spherical shape, as shown in FIG. 14. In one embodiment, spherical nanorobots 115 having various sizes are used in a single formation. The larger diameter nanorobots 115 are only able to move along pathways 120 in the formation 102, while smaller diameter nanorobots 115' are able to travel along smaller pathways 121. The pathways 120 accessible to all nanorobots 115, 115', are at least as large as the largest nanorobot 115. Pathways 121, being accessible to the smaller nanorobots 115' but not nanorobots 115, are identified as being smaller than nanorobot 115 but larger than nanorobot 115'. The cross-section of each pathway is defined as the distance, transverse to the path of the nanorobot 115, between the walls, or surfaces, of the cavity. Finally, pathways 122 may be so small that they are not accessible to any nanorobots. As one of skill in the art will appreciate, the nanorobots 115, 115', thus, serve as a type of "go/no-go" gage to measure the size of pathways within the formation 102.

The powered propulsion devices 164, as shown in FIGS. 8A-8D can be powered directly from the power supply 208, or the power supply power can be routed through the onboard computer 124. A single nanorobot 114 can have more than one powered propulsion device, and can use gravity and fluid flow in combination with the powered propulsion device.

In some embodiments, the propulsion device 164 includes one or more propellers 166. The propeller 166 can be a molecular propeller with blades formed by planar aromatic molecules and a shaft comprising a carbon nanotube. One of ordinary skill in the art will appreciate the nano-motor required to rotate propeller 166. Any of the propulsion techniques, including the propeller 166, can be used in conjunction with one or more rudders 234 to steer the nanorobot. Rudders 234 can be moved by, for example, signals from an onboard computer 124 to cause the nanorobot 114 to alter its trajectory.

In another embodiment, the propulsion device 164 can include flagella 170. In this embodiment, the nanorobot has a leg-like or fin-shaped appendage similar to that of bacteria or paramecia. The flagella 170 can use a biomimetic synthetic flagella composed of multiwalled carbon nanotubes.

Figure 8A:
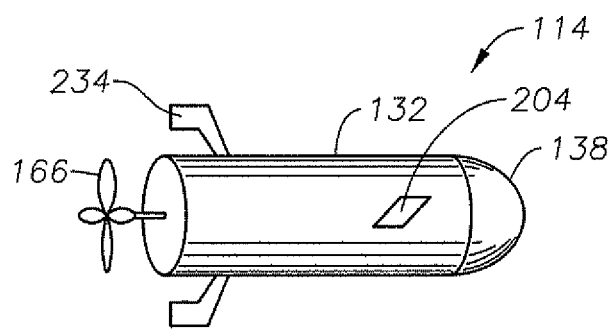
FIG. 8A is a perspective view of a geophysical nanorobot having a propulsion device according to yet another embodiment of the present invention.
Figure 8B:
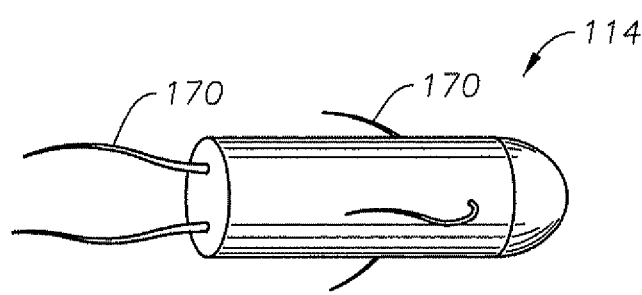
FIG. 8B is a perspective view of a geophysical nanorobot having a propulsion device according to yet another embodiment of the present invention.
Figure 8C:
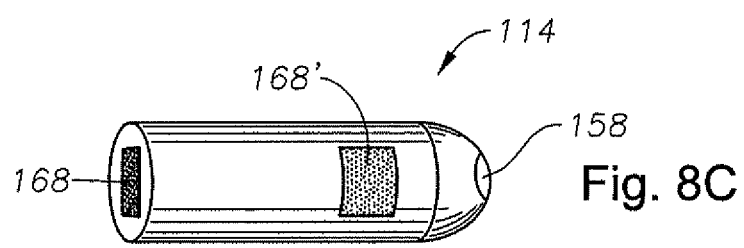
FIG. 8C is a perspective view of a geophysical nanorobot having a propulsion device according to yet another embodiment of the present invention.
Figure 8D:
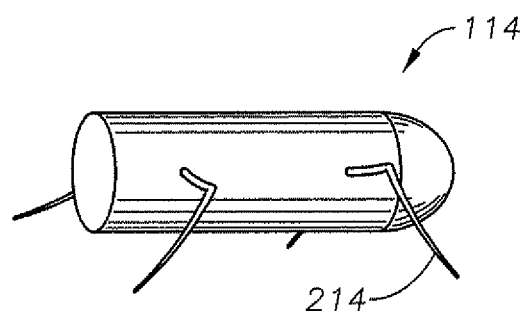
FIG. 8D is a perspective view of a geophysical nanorobot having a propulsion device according to yet another embodiment of the present invention.

In another embodiment, a rapidly vibrating membrane 168 can provide the necessary thrust to propel the nanorobot. The vibrating membrane 168 can be alternately tightened and relaxed to produce thrust. Because the nanorobot is so small, the thrust produced by the vibrating membrane 168 can be sufficient to propel the nanorobot. Vibrating membranes 168 can be located on more than one surface of the body 132 and, thus, used to steer the nanorobot 114. For example, a nanorobot can have vibrating membrane 168 on a rear surface to propel the robot 114 forward, and can also have one or more vibrating membranes 168' to cause lateral movement or to cause the nanorobot 114 to turn and move in a different direction than its current trajectory, as shown in FIG. 8C.

Figure 10:
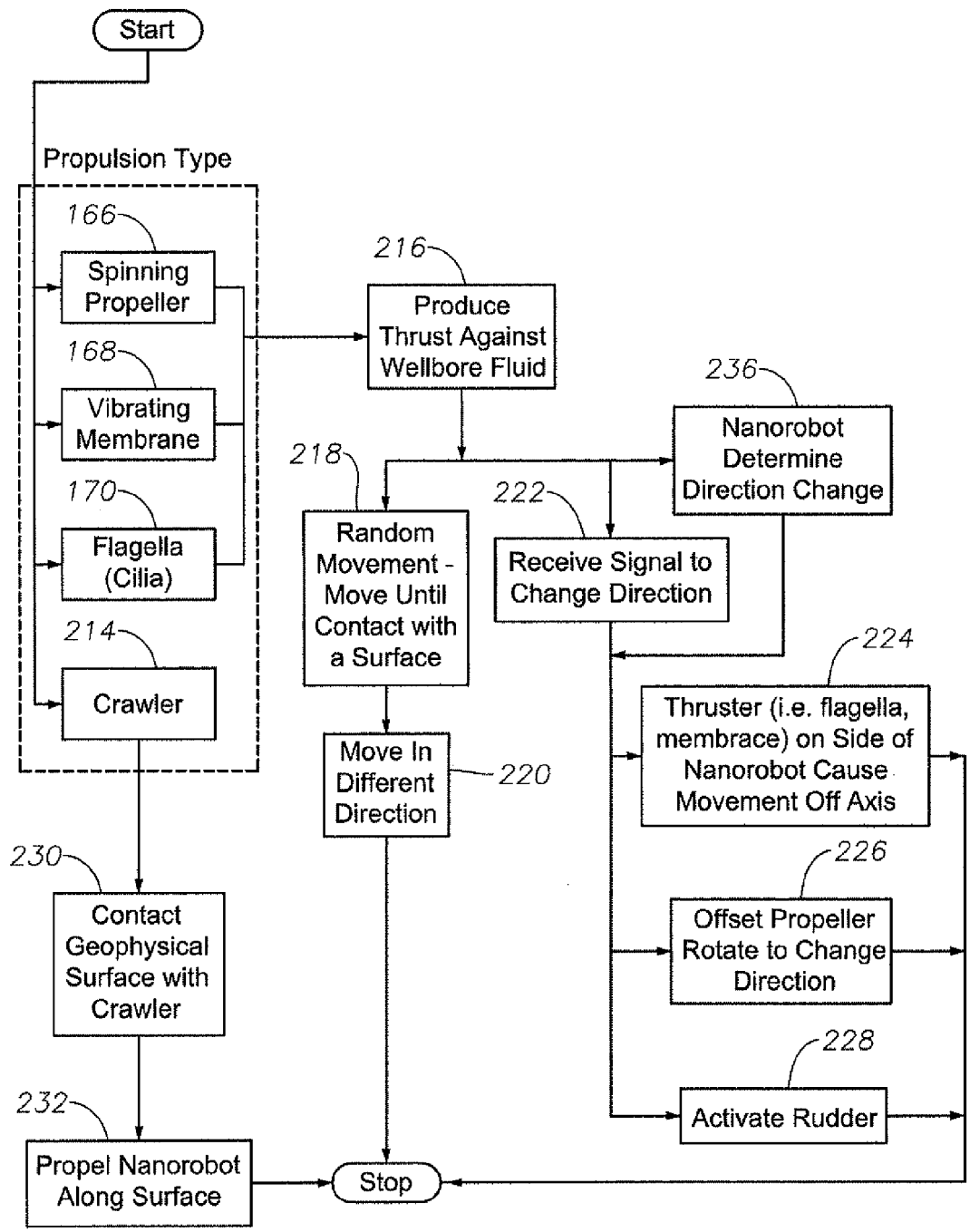
FIG. 10 is a flowchart of operational propulsion of a plurality of geophysical nanorobots in a geophysical formation according to another embodiment of the present invention.

As shown in FIG. 10, propulsion devices 164 such as propellers 166, membranes 168, and flagella 170 can each produce thrust 216 against a wellbore fluid 112. In one embodiment, the nanorobot 114 moves in random directions 218 until it makes contact with a surface 152. Upon contact, the nanorobot moves in a different direction 220. In another embodiment, the nanorobot 114 can receive a signal to change direction 222 from, for example, the control computer 126, or the onboard computer 124 of the nanorobot can determine that it is necessary to change direction. In response to the signal 222 or determination 236 to change direction, the nanorobot 114 can use a thruster such as its flagella 170 or lateral vibrating membrane 168' to cause it to change direction off of its current axis of movement 224.

Some embodiments can have a propeller 166 that is offset from the center of the nanorobot body 132, which can cause a change in direction 226. In embodiments having a rudder 234, the nanorobot can move the rudder 234 in response to the signal to change direction 236, 222 and thus cause a change in direction.

In still another embodiment, the propulsion device 164 can include crawlers 214 wherein mechanical legs, such as carbon nano tube legs, are driven by nano-motors to enable the nanorobot to "walk" within the rock formation, even in the absence of liquid fluids. In these embodiments, the nanorobot comes into contact with a surface 230 in the formation 102, and the crawler 214 propels the nanorobot 114 along the surface 232. Other variations of the propulsion device can include wriggling, rolling, and worm-like or gecko-like movement, all of which can be performed within a fluid or in the absence of a fluid. There can be overlap between a crawler 214 and other propulsion devices. For example, flagella 170 can propel the nanorobot through fluid 216, and can, at other times, contact a surface 230 and cause the nanorobot 114 to move along the surface 232.

As one of skill in the art will appreciate, the propulsion devices can be powered by various kinds of motors 238, including, for example, nano-motors and Brownian motors. Brownian motors are nano-scale or molecular devices by which thermally activated processes (chemical reactions) are controlled and used to generate directed motion in space and to do mechanical or electrical work. In one embodiment, a radio frequency powered motor 240 is used to drive the propulsion device 164. In this embodiment, a radio frequency transmitter, which could be the same transmitter used for communication, generates a signal that causes the RF motor 240 to actuate.

The nanorobot 114 can have an onboard computer 124, as shown in FIGS. 5, 6, and 9. In some embodiments, the computer 124 includes a processor 244, memory 246, and an input/output device 248. The computer 124 could be a quantum computer, a nanotube computing system, a nano-machine, a molecular computer, or a combination thereof. The onboard computer processor 124 can have parallel processing capabilities.

The onboard computer 124 can serve as a controller for the nanorobot 114. The controller can initiate and manage functionality within other onboard components based on, for example, the data collected by the sensors. In an exemplary embodiment, sensor readings cause a response from the nanorobot. In one example, when the sensor 138 detects a hydrocarbon, the controller 124 actuates the transmitter 128 and causes the transmitter 128 to transmit the current location and the presence of the hydrocarbon to the wellbore fixed receiver 134. In another example, when the sensor 138 reading does not show a hydrocarbon, the controller actuates the propulsion device 164, causing the nanorobot 114 to move to a new location.

The onboard computer 124 can also serve as a memory device. In the event that the nanorobot 114 is unable to transmit data regarding, for example, its position or the presence of a hydrocarbon, the data is stored in the onboard computer memory 246 until the nanorobot 114 is able to transmit or until the data is otherwise downloaded to a data collector. A data collector (not shown) includes a device to collect nanorobots from a collection point, such as in production fluid, extract the nanorobots 114, and then download the memory of the nanorobots into a computer memory.

The nanorobot can have communication abilities, such as a radio frequency transmitter 128 and a radio frequency receiver 130. The transmitter 128 and receiver 130 are best shown in FIGS. 5, 6, and 9. The nanorobot computer can control the transmitter 128 and direct signals to the transmitter for transmission. The nanorobot computer can also receive data through the receiver 130. An antenna 131 may be connected to or integral with the transmitter 128 and receiver 130. In one embodiment, the receiver 130 and transmitter 128 are the same component—a reactive identification tag 133, such as a radio frequency identification tag or radio frequency identification device ("RFID"). The radio frequency identification tag receives a signal and, in response to the signal, transmits a signal.

The nanorobot uses the radio frequency transmitter 128 to transmit various data to receivers 532, such as fixed receivers 134 located in the wellbore 100. The radio frequency transmitter transmits, and the fixed receiver receives, radio frequency transmissions at preselected frequencies. The transmitted data could include, for example, the presence or absence of hydrocarbons, the type of hydrocarbon encountered by the nanorobot, the pressure and temperature inside the formation, and the position of the nanorobot 114.

In an exemplary embodiment, the nanorobot 114 has a radio frequency receiver 130. The nanorobot receiver 130 receives signals, for example, from fixed transmitters 136 located in the wellbore 100. The transmitted signals could include, for example, instructions directing the nanorobot 114 to move in a different direction or to a different specified location.

Figure 13:
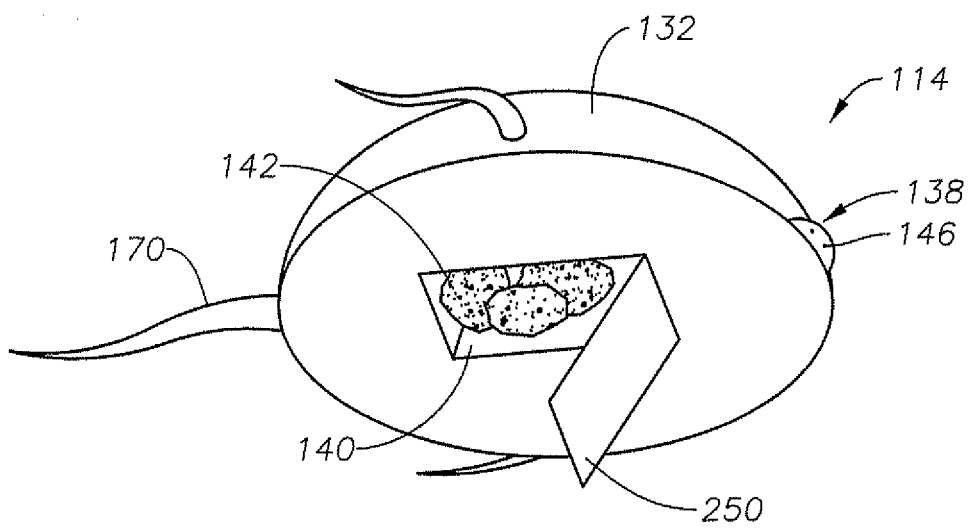
FIG. 13 is a perspective view of a geophysical nanorobot having a payload bay and a flagella propulsion device according to yet another embodiment of the present invention.

In some embodiments, the nanorobot can have a payload bay 140 for delivering a payload 142 to a location inside the geophysical formation 102, as shown in FIG. 13. The payload 142 could be, for example, a surfactant used to change the surface tension of the fluid inside the formation. Alternatively, the payload 142 can be a matrix acidizing or damage removal fluid, a formation consolidation chemical for sand control, or a polymer for conformance control. In one embodiment, the payload 142 includes a swelling hydrophilic polymer for obstructing undesirable pathways. The payload bay 140 can have one or more doors 250 which protect the payload during travel. When the nanorobot reaches the delivery point, the payload doors 250 can open to release the contents. In one embodiment, the payload door 250 forms a hermetic seal to prevent fluids from contacting the payload 142 prior to opening the door 250.

The payload delivery point can be determined by a variety of devices. In one embodiment, the sensor 138 or on board computer 126 can open the door when the sensor 138 detects a predetermined condition. For example, if the sensor 138 detects crude oil having a viscosity higher than a predetermined amount, the sensor sends a signal to the payload door 250 actuator, causing the payload door to open. Alternatively, the onboard computer 124 could open the payload door 250 when the nanorobot 114 reaches a predetermined location. In still another embodiment, a signal transmitted from the above-ground nanorobot control computer 126, via the wellbore fixed transmitters 136, directs the payload door 250 to open. In one embodiment, an electromagnetic signal from the wellbore fixed transmitters can actuate the payload door 250. One of skill in the art will appreciate the usefulness of being able to deliver various payloads into the pores of a geophysical formation.

FIGS. 5, 6, and 9 show exemplary embodiments of the interconnections and wiring between various components within the nanorobot body 132. Furthermore, FIG. 9 shows wireless signal connections between the nanorobot and the wellbore transmitters 136 and receivers 134. The power supply 208 can provide power to the computer 124. In some embodiments, the computer 124 provides and controls the application of power to other components, such as the onboard receiver 130, the propulsion device 164, and the sensor 138. In other embodiments, the power supply can provide power directly to the components such as the propulsion device 164.

The nanorobots 114 can be inserted into the geophysical formation 518 and inserted into the rock pores by a variety of devices. For example, the nanorobot can be placed in water 116 or fluid used for secondary recovery operations (FIG. 15). The nanorobot-containing water is injected into the reservoir or rock formation 102, thus carrying the nanorobots 114 along the same pathways used by the pressure-injected water. One skilled in the art will appreciate that the nanorobots can be inserted through a discovery well, a production well, a water-injection well, a well drilled for the sole purpose of inserting probes, or any other routes into the geophysical formation. This technique is used anticipating that the injected nanorobots will flow into, and along, permeability pathways 120, as shown in FIG. 3 (the enlarged section of FIG. 3 is drastically enlarged—the nanorobots 114 are less than 500 nanometers wide).

Alternatively, the nanorobots can be placed in a carrier 252, such as a cylinder or a running tool attached to the drill string or lowered on a cable 254 through the wellbore 100. The carrier can have doors that open to release or deploy the nanorobots 114 at various locations within the wellbore 520. The wellbore can be perforated as appropriate so that the nanorobots 114 can move through the perforations 256 through the sides of the wellbore. If the existing wells are not in the correct location 514 for inserting nanorobots 114, an additional insertion well or exploratory well may be drilled 516.

An alternative insertion method is to place the nanorobots 114 in the drilling mud (not shown). Drilling mud is used to lubricate the earth-boring drill bit. Drilling mud also carries spoil (earth and rock dislodged by the bit) up to the surface. Nanorobots can be placed in the drilling mud before the mud is injected into the wellbore. The nanorobots then travel through the sides of the wellbore into the rock formation.

The nanorobots can also travel ahead of the drill bit (not shown), into the rock that is going to be drilled. In this application, the nanorobot transmits data regarding the rock that is about to be drilled back to the surface. Real time downhole mud properties, formation stress, and borehole stability data can be transmitted during drilling operations. This data could be helpful for geosteering and well placement. In some embodiments, the nanorobots are sent ahead of the drill bit to collect "true formation data" before the drill bit and mud alter the formation characteristics.

FIG. 17 illustrates embodiments of several techniques to release 258 nanorobots 114 into a formation 102. If the release technique uses water drive insertion 260, the nanorobots are first placed in the drive water 262. Water is used for illustration only. Other types of drive fluid can be used. The drive water is injected into the formation 264, the nanorobots 114 being injected with it. Additional water (or drive fluid) can be injected 266 after the nanorobots 114 are released to cause the nanorobots to move further into the formation 102.

If the wellbore carrier 252 is used for insertion 268, the nanorobots are first placed into the carrier 270 and then the carrier is lowered through the wellbore 100, or another borehole into the formation 102, to the desired depth 272. The carrier then ejects the nanorobots from the carrier 252 into the wellbore 274. If drilling mud is used to insert the nanorobots 276, the nanorobots are first placed into the drilling mud 278 and then the drilling mud is pumped into the wellbore 280. Once released, the nanorobots from the carrier or the drilling mud can be caused to move into the formation 102, by, for example propelling themselves through cavities in the formation 282.

As shown in FIG. 18, the wellbore 100 is lined with a casing 104, such as a metal tube. Multiple fixed receivers 134 can be attached to the casing 104 or embedded within the casing 104. The fixed receivers 134 can be spaced apart longitudinally along the casing 104. The fixed receivers 134 can also be spaced apart around the circumference of the casing 104. The wellbore 100 can also be lined with fixed transmitters 136 for transmitting data to the nanorobots 114. The fixed transmitters 136 are longitudinally spaced apart along the casing 104. The fixed transmitters 136 can be co-located with the fixed receivers 134 or be combined in the same housing with the fixed receivers 134. Fixed receivers 134 and fixed transmitters 136 can also be located on the surface, as shown in FIG. 2. The fixed receivers 134 and fixed transmitters 136 can be powered by, for example electricity from batteries or wires passing through or embedded in casing 104.

As shown in FIGS. 2 and 9, each nanorobot onboard transmitter 128 can transmit data to one or more fixed receivers 134 located in the wellbore or on the surface. The fixed receivers 134, in turn, can transfer the data to control computer 126 for processing and analysis. The control computer 126 can be located on the surface. Similarly, the control computer 126 can send information to the nanorobots 114. The information from the control computer can be broadcast by the fixed transmitters 136 located in the wellbore or on the surface. In one embodiment, if the nanorobot 114 is unable to transmit to an fixed receiver 134, the nanorobot 114 can store the information for later transmission.

Figure 20:
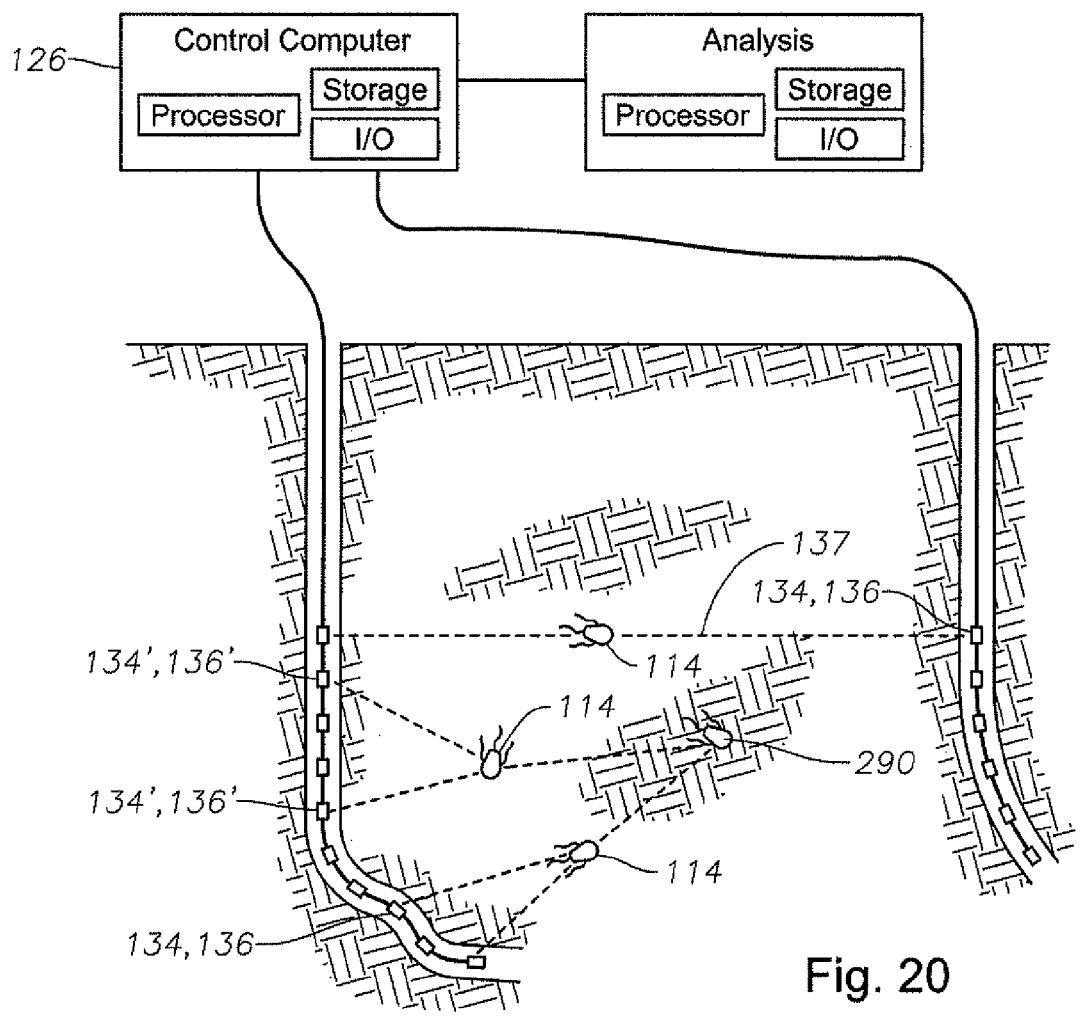
FIG. 20 is a partial sectional view of a geophysical nanorobot based geophysical exploration system according to yet another embodiment of the present invention.

In some embodiments, signal cables such as wires or fiber optic cables transfer data from the fixed wellbore receivers 134 to the control computer 126. In other embodiments, the fixed wellbore receivers can wirelessly transmit data to the control computer 126 using, for example, radio frequencies. Some wireless fixed receivers may be unable to directly communicate with the control computer 126 because, for example, the fixed receiver 134 is located too far below the surface. In one embodiment, fixed receivers 134 have a relay transmitter and are able to transmit data to another fixed receiver 134', as shown in FIG. 20. The second fixed receiver 134' is then able to relay the data to the control computer 126, or to subsequent fixed receivers 134. Thus the fixed receiver 134 that is in communication with a nanorobot 114 can relay data through other fixed receivers 134' to the surface. Similarly, in the event a fixed transmitter is unable to communicate with the control computer 126, other fixed transmitters 136' can relay the signal to the fixed transmitter 136 that is in communication with a nanorobot 114.

As shown in FIGS. 2 and 9, the fixed transmitters 136 can transmit instructions and data to the nanorobots 114 such as instructions to change direction or move to a specific location. The fixed transmitters 136 can send information that is received by the onboard receiver 130 of the nanorobot 114. The transmitters can also transmit a locating beacon which a nanorobot 114 can use to determine its own position.

The nanorobot deployment can use swarm characteristics, wherein hundreds, thousands, or even billions of nanorobots work together to map the formation 102, as shown in FIG. 2. The nanorobots can disperse throughout the formation 102, or can concentrate as a swarm 286 in one area of interest. The nanorobots 114 can all be the same, or different types of robots with different types of sensors can be employed. In some embodiments, the nanorobots 114 communicate with each other.

Figure 19:
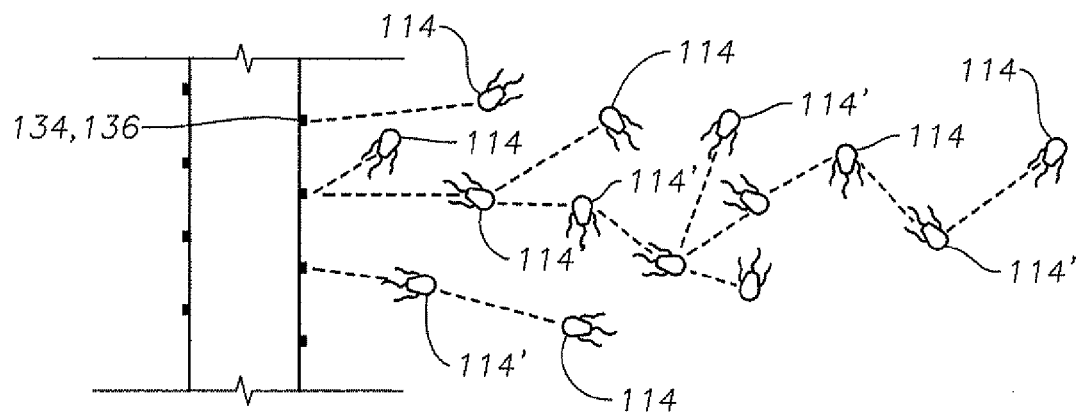
FIG. 19 is an environmental sectional view of a plurality of geophysical nanorobots relaying transmissions to wellbore receivers according to yet another embodiment of the present invention.

In some embodiments, an individual nanorobot 114 may not be able to communicate with any fixed transmitters 136 or receivers 134. In one embodiment, nanorobots are able to relay data from other nanorobots, as shown in FIGS. 2 and 19. In one embodiment, if a nanorobot 114 is too far from a receiver 234 to transmit a signal, the nanorobot 114 can send its data to another nanorobot 114', as shown in FIG. 19. Nanorobot 114', in turn, transmits the data to the fixed receiver 134. In one embodiment, nanorobots can form a chain where the signal is transmitted through multiple relay nanorobots 114' back to the wellbore receiver 134. Similarly, multiple nanorobots 114' can relay a message from a wellbore fixed transmitter 136 to a distant nanorobot 114.

In some embodiments, multiple wellbore radio frequency fixed receivers 134 can receive a signal from the nanorobot 114, in which case the control computer 126 can use the received signals to triangulate the position of the nanorobot, as shown in FIG. 20. In this embodiment, each wellbore receiver 134 can determine the direction of the signal from the nanorobot 114. By mapping the intersection of two or more direction signals 288, the control computer 126 can determine the location of the nanorobot 114. Preferably, three direction signals are used to determine an accurate three-dimensional location of the nanorobot 114. In embodiments having a reactive identification tag 133, the wellbore fixed transmitter 136 can transmit a signal that causes the reactive identification component to emit a signal. A wellbore fixed receiver 134 can detect the emitted signal from the reactive identification tag 133, and use the signal to determine the direction to the nanorobot 114. When two or more wellbore fixed receivers 134 detect the emitted signal, they can triangulate to determine the position of the nanorobot 114. Because each reactive identification tag 133 can emit a unique signal, the control computer 126, upon receiving the signal data from the wellbore fixed receivers, can determine the location of a particular nanorobot 114. The control computer 126, thus, can track the location of a particular nanorobot 114 over time to determine the path traveled by the nanorobot 114. For triangulation, the fixed transmitters 136 and fixed receivers 134 may all be located in the same wellbore 100, or a portion of the fixed transmitters 136 and fixed receivers 134 could be located in a different wellbore 100 or on the surface. As shown in FIG. 20, signal 137 can pass from an a fixed transmitter 136 in one wellbore to fixed receiver 134 in a different wellbore. The location of nanorobot 114 is determined by the point that signal 137 contacts nanorobot 114. In one embodiment, the triangulation can work using beacon signals from the wellbore fixed transmitters 136. Each transmitter 136 emits a unique signal. The nanorobots 114 receive the unique signals using the onboard receivers 130 and are able to triangulate their own position, from the beacons, using the onboard computer 126.

As shown in FIG. 20, a nanorobot 290 may be too far from the wellbore to transmit a signal to the wellbore receivers 134. In one embodiment, however, the nanorobot 290 can transmit to other nanorobots 114. Because the location of the other nanorobots 114 is known, the other nanorobots 114, thus, can triangulate to determine the location of nanorobot 290, and then transmit the location of nanorobot 290 back to the wellbore receiver 234.

Figure 22:
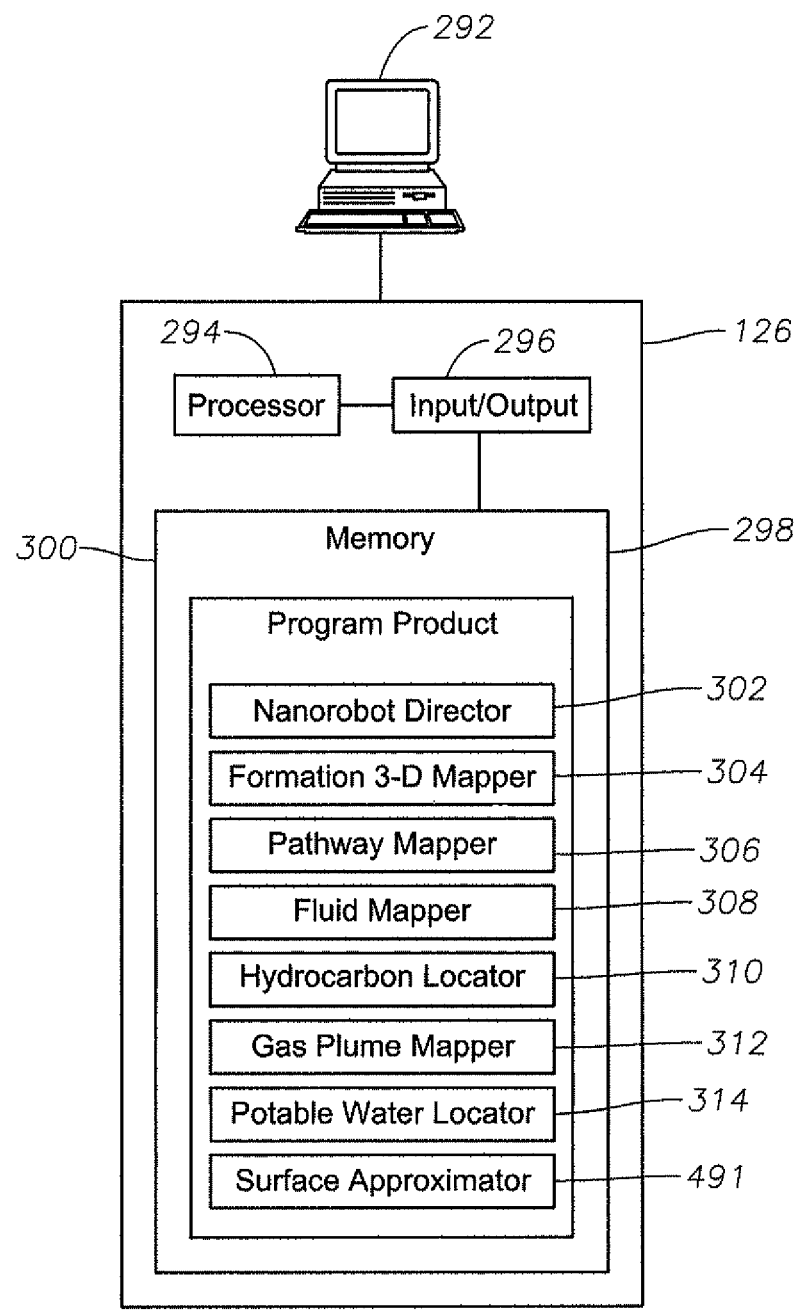
FIG. 22 is a functional block diagram of a computer to control a plurality of geophysical nanorobots and analyzing data from geophysical nanorobots according to another embodiment of the present invention.

One or more control computers 126 are used to receive data from the nanorobots, interpret the data from the nanorobots, and control and direct the nanorobots. An exemplary embodiment of a control computer 126 is shown in FIG. 22. The one or more computers providing these functions are referred to collectively as the "control computer." In some embodiments, the control computer includes an operational control computer and a geophysical mapping computer. In other embodiments, the control, analysis, and mapping functions are performed by a single computer. The nanorobot control computer 126 collects data from the nanorobots 114. The control computer 126 can use this data to identify fluid properties 535 and the location of pathways 538. The data can come from the fixed receivers 134 located in the wellbore or above ground, or the data can be offloaded from the nanorobot 114 after the nanorobot is recovered.

The nanorobot control computer 126 is a machine that can include a display 292, a processor 294, an input/output device 296, a memory unit 298, and a set of instructions 300 stored in a non-transitory, computer-readable storage medium with an executable program, as shown in FIG. 22. The non-transitory computer readable storage medium can be the machine memory 298, or it can be a separate storage medium for loading onto the machine. When executed by the machine, the program product 300 can cause the machine to perform the following tasks: Nanorobot Director 302; Formation 3D Mapper 304; Pathway Mapper 306; Fluid Mapper 308; Hydrocarbon Locator 310; Gas Plume Mapper 312; Potable Water locator 314 and Surface Approximator 491. Functions in any of the sets of instructions can be included in other sets of instructions.

The Nanorobot Director 302 set of instructions sends information and directions to the nanorobots 114. Preliminary data from the nanorobots can indicate an area of particular interest within the formation ("area of interest"). The nanorobot control computer can send instructions, via transmitters, to nanorobots in the formation, directing the nanorobots to move to the areas of particular interest. The nanorobot control computer can also interpret data regarding hydrocarbon characteristics and formation structure, and then instruct payload-carrying nanorobots to a specific location and then order the nanorobots to discharge their payload at that location.

Figure 23:
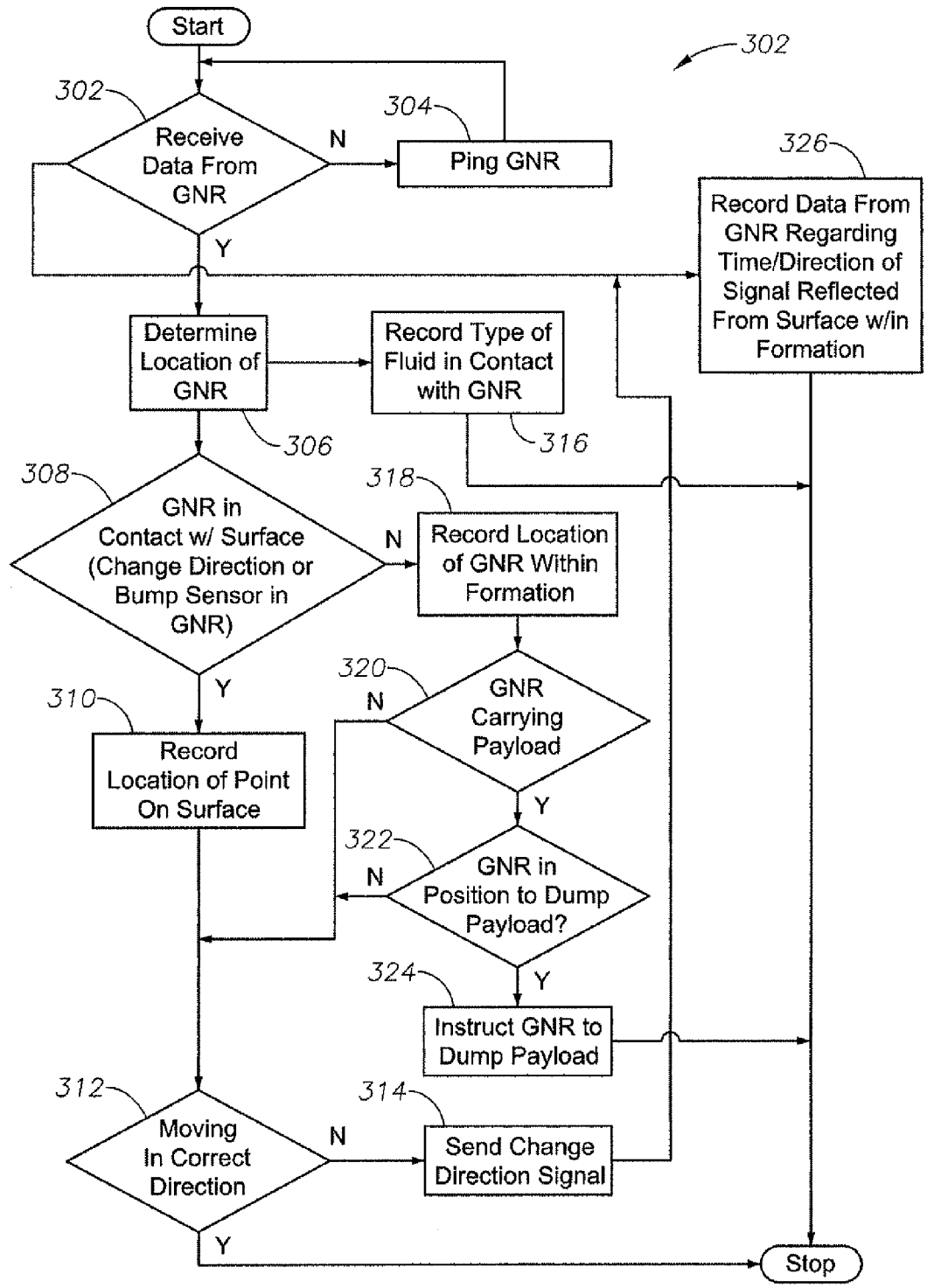
FIG. 23 is a flowchart of a controller operating a plurality of geophysical nanorobots according to another embodiment of the present invention.

In one embodiment, shown in FIG. 23, the control computer 126 first determines 302 whether it is receiving data from a nanorobot 114 or from a particular nanorobot 114. If it is not, it will send a signal, or ping, the nanorobot to establish communication or wait until it receives data 304. (The term geophysical nanorobot is abbreviated as "GNR" in some drawings). Any time that any program product receives data from a nanorobot, the data can come from any technique. For example, the data can be in real time or near real time, wherein the data is transmitted from the nanorobot 114 to a wellbore receiver 134 and relayed from the wellbore receiver 134 to the control computer 126. Alternatively, the data can be stored in the nanorobot computer as it is acquired and uploaded to the control computer at a later time. Upon receiving data from the nanorobot, the computer can determine the location of the nanorobot 306. The location can be determined by, for example, triangulation from wellbore receivers 134 or from position data stored in the nanorobot. The computer 126 can determine whether the nanorobot is in contact with a surface within the formation 308. If so, the computer will record the location of the nanorobot's position at the time of surface contact to establish a location of a point on the surface 310. The computer 126 can then determine whether the nanorobot 114 is moving in the correct direction 312, such as towards a predetermined area of interest. If so, the computer will allow the nanorobot to keep going. If not, the computer 126 will send a change direction instruction signal through the fixed radio transmitters 314 and then wait until it again receives data from the nanorobot 302. The nanorobot will propel in a direction different than its current trajectory responsive to the instruction from the machine transmitted via the fixed radio transmitters and thus, for example, move toward an area of interest. The computer can also record the type of fluid in contact with the nanorobot 316. The computer can receive raw sensor data, such as the amount of resistance measured by the nanorobot's electrode, or it can receive more specific fluid-type data from the nanorobot. When recording the type of fluid at step 316, the nanorobot can also record the location of the fluid based on the nanorobots location at the time of contact with the fluid (from step 306). At step 308, if the nanorobot is not in contact with a surface in the formation, the computer 126 will still record the nanorobot's position at step 318. If the nanorobot is carrying a payload 320, the computer determines whether the nanorobot is in the correct position to dump the payload 322. If so, the computer instructs the nanorobot to dump the payload 324. In one embodiment, the computer first identifies a plurality of cavities in communication with one another, each cavity having a cross-sectional area greater than a predetermined value to define a pathway. Then, upon determining that a pathway exists, the computer causes a portion of the nanorobots located with in the pathway to release their payload within the pathway. This could be done, for example, if the payload is a swelling hydrophilic polymer and it is desirable to obstruct the pathway. If not, or if the nanorobot is not carrying a payload, the computer determines whether the nanorobot is moving in the correct direction at step 312. If the nanorobot has a non-contact surface sensor, such as an ultrasonic sensor 158 or RF sensor 160, the computer 126 records information from the reflected sensor signal in step 326.

The Formation 3-D Mapper 304 set of instructions creates a three dimensional map of the geological formation. The nanorobot control computer combines the data from one or more nanorobots and uses it to create a three dimensional map of the formation. The map will indicate the edges of the reservoir and the fluid contacts for the field. The Formation 3-D Mapper 97 is able to update the map in real time. Features on the map can include hydrocarbon location, water location, pore size, etc. The mapping program 304 can include instructions for flood monitoring, which can map the progress of water through the reservoir during hydrocarbon extraction operations.

Figure 24:
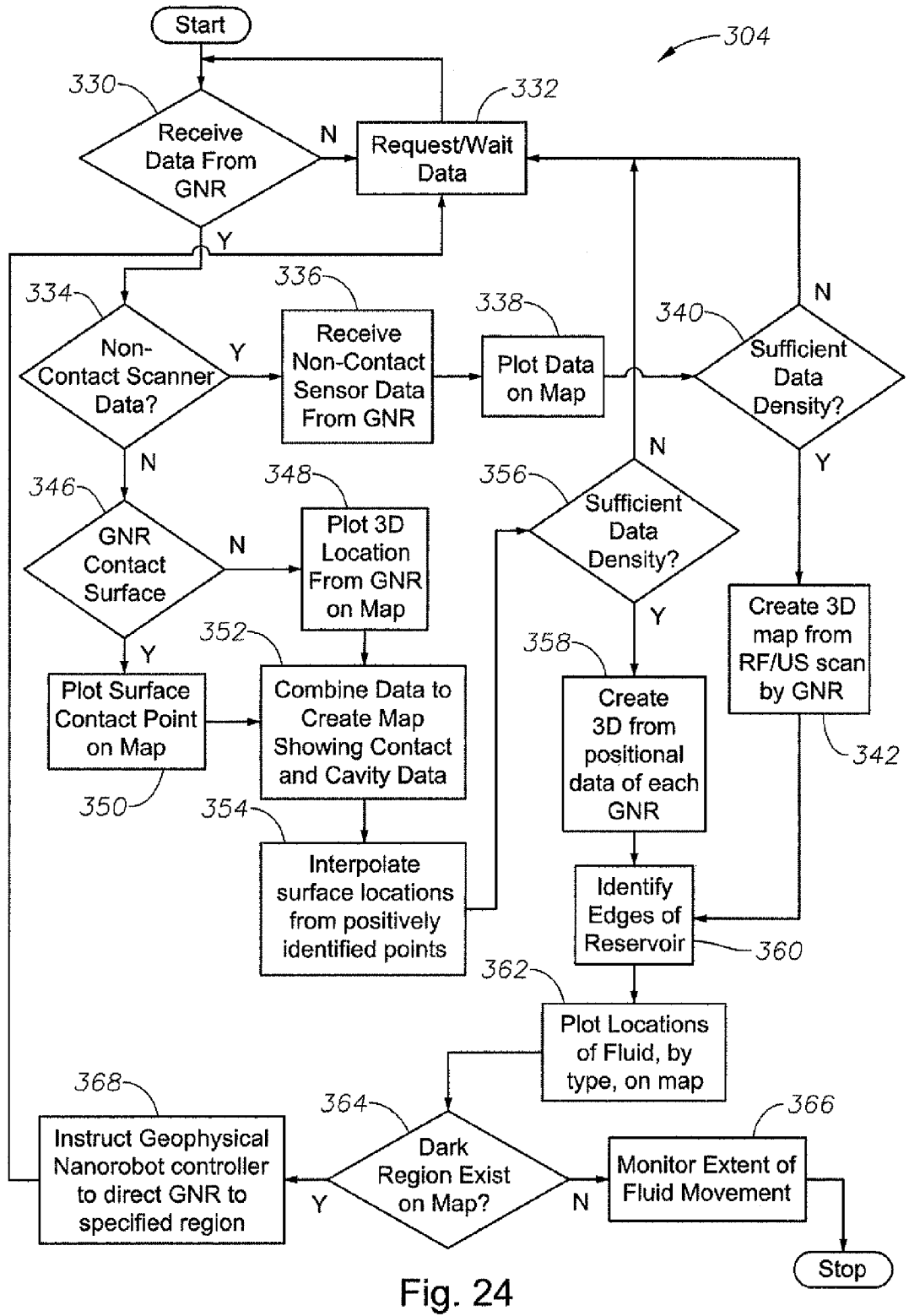
FIG. 24 is a flowchart of operational mapping of a geophysical formation using data from a plurality of geophysical nanorobots according to another embodiment of the present invention.

In one embodiment, shown in FIG. 24, the formation 3-D Mapper 304 performs the following steps. The computer first receives data from the nanorobot at step 330. If no data is available, it waits for data at step 332. If data is available, the nanorobot determines whether it is non-contact scanner data 334. If so, it receives the scanner data 336 and plots the data on a 3D map 338. Scanner data, being data actually reflected from interior points in the formation, is a sensed three dimensional location. If there is sufficient data density to create a 3D map 340, the computer plots the scanned data 342. If there is not sufficient data at 340, the computer requests and waits for more information 332. If the forthcoming data is contact sensor data at 334, the computer determines whether the nanorobot is in contact with a surface at 346. If not, the computer determines the nanorobot is floating within a cavity and thus identifies open cavity space at 346. If the nanorobot is in contact with a surface, the control computer plots the surface contact point on the 3D map 350. Each actual contact point is a sensed three dimensional location of a surface within the interior of the geophysical formation, in that the location was sensed by the nanorobot. The sensed three dimensional location of at least one point on each of a plurality of interior surfaces within the geophysical formation, thus, is interior surface location data. The surface contact points and open cavity space data are combined to create a 3D map at 352. In one embodiment, wherein the nanorobots do not signal actual contact with the surface, the point on an interior surface can be determined by the presence of the nanorobot and a go/no-go indication from the nanorobot. If a nanorobot of a given size is present at that location, then the cross-section of the cavity at that location is at least as big as the nanorobot. The surface locations at that location, thus can be approximated round the location of the nanorobot. Surface locations near the contact points are interpolated from the contact and cavity data at 354. The machine, thus, generates an interpolated map, responsive to the interior surface location data, by projecting surfaces between representations of the at least one points on each of the plurality of interior surfaces of the geophysical formation, the interpolated map identifying a physical shape and a location of a plurality of surfaces in the geophysical formation. If the data density is not sufficient to develop a map, the computer requests and waits for data at 332. If it is sufficient, a 3D map is developed at 358. The 3D map from contact data and/or the 3D map from non-contact data is used to identify the edges of the reservoir at 360. The locations of fluids identified by the nanorobots are added to the reservoir map at 362. The computer then determines whether dark regions exist on the map. A dark region is an area where no data is available from nanorobots—because nanorobots have not yet explored the cavities, the receivers are not able to receive information from the nanorobots, or because the region is solid and not accessible to nanorobots. If no dark regions exist, the computer continues to receive data from the nanorobots to monitor the extent of fluid movement, such as the extent of water drive or floodwater movement. If dark regions exist and the computer determines nanorobots should be able to provide data, the computer can instruct nanorobots to move toward the dark region at step 368 and then wait for data at 332.

The Fluid Mapper 308 set of instructions can plot the locations of fluids on the map and identify and monitor various fluid properties. In one embodiment, shown in FIG. 25, the computer first receives 3D map information at step 372. The instructions then cause the computer to create a fluid map by plotting the type and location of fluids onto the interpolated map of the geophysical formation so that physical representations of fluids within the geophysical formation are displayed on the computer 374. From the fluid locations and the map of the cavities in the formation, the computer can then identify the edges of the reservoir at 376. The computer can then use fluid data, such as the pressure of the fluid at various locations, and assign pressures to fluid regions on the map at 378. As water or other drive fluids move through the formation, the computer can monitor the extent of the water or fluid movement at step 380. Finally, the fluid mapper instructions can cause the computer to model the current and future flows of fluids through the formation based on the fluid data and the cavity data, at step 382.

The Pathway Mapper 306 set of instructions locates pathways through the formation 538. The computer program interprets data from swarms of nanorobots moving through pathways within the formation. The data includes the nanorobot's movement, trajectory, and velocity. The computer program also considers nanorobot sensor readings, such as ultrasonic sensors and contact with rock surfaces. The data is combined to create detailed maps of pathways and pores within the formation. The Pathway Mapper 306 set of instructions also identifies high permeability pathways within the formation. When water is injected for secondary recovery, the pressurized water tends to flow through large pathways. The water may take a circuitous route through several high permeability pathways from the injection point to the hydrocarbon extraction point (the production well). These pathways frequently bypass substantial amounts of hydrocarbons. The computer program is able to integrate pathway data from multiple nanorobots to form a model of the pathways. In some embodiments, the model can identify locations for production wells and injection wells to achieve maximum extraction of hydrocarbons. The computer can use data from the nanorobots to map "thieve zones" or high-permeability "super-K" zones within the reservoir. This data can be used to enhance conformance control and water shut off operations. The nanorobot can also identify the locations of pathways through the formation. Some pathways are larger than others. Water-drive water may pass through the larger pathways while bypassing hydrocarbon deposits. The pathway mapper instructions can cause the control computer to identify such large pathways based on data from the nanorobots. The computer can also use the data to create a pore network model ("PNM") that depicts the entire pore network of the formation.

Figure 26:
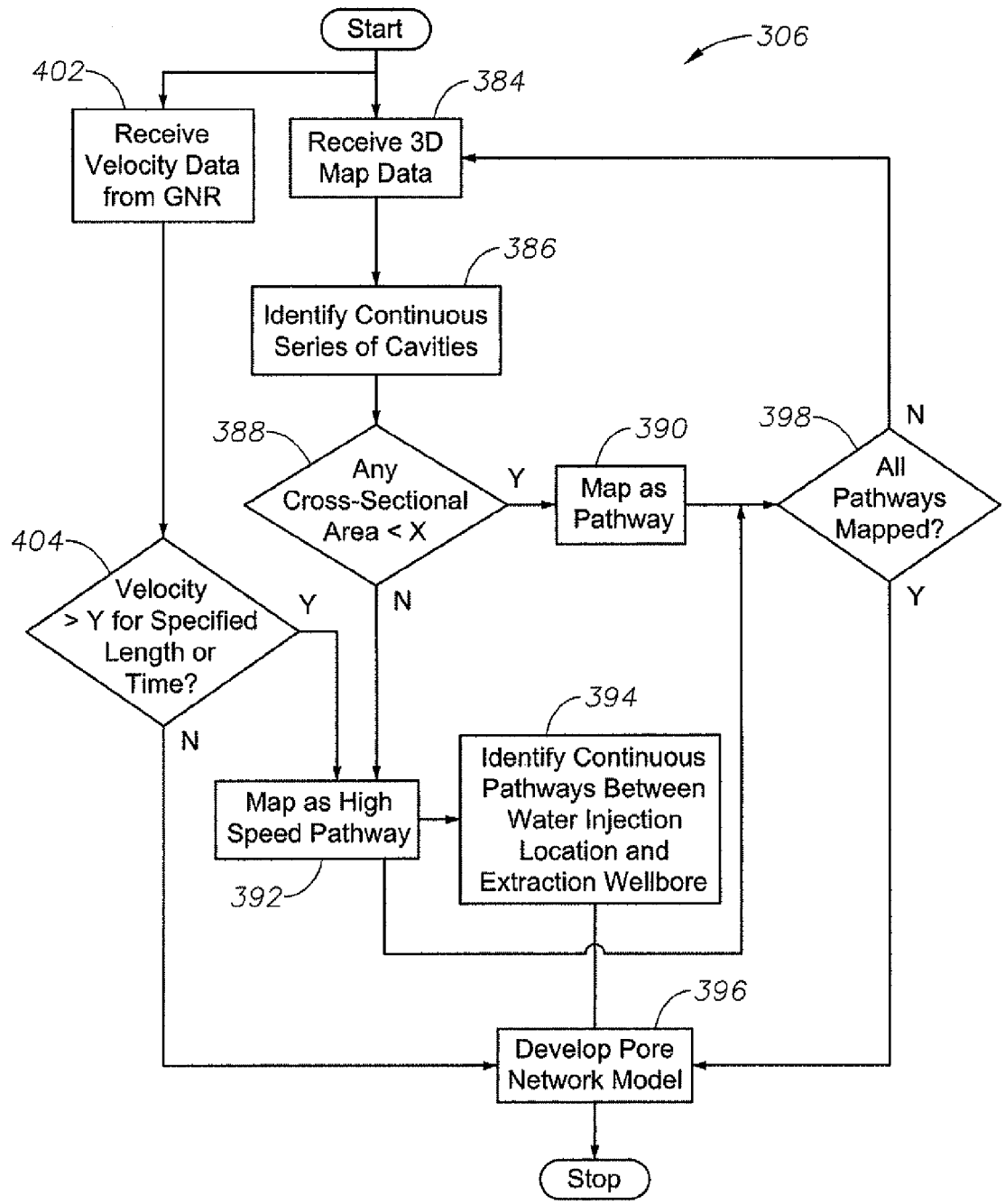
FIG. 26 is a flowchart of operational mapping pathways using data from a plurality of geophysical nanorobots according to another embodiment of the present invention.

In one embodiment, the Pathway Mapper 306 causes the computer to perform the following instructions, as shown in FIG. 26. The computer receives 3D map data at step 384. The data can include the locations of cavities, or pores, within the formation, and the locations of the surfaces that define the cavities. The computer analyzes the cavity data to identify continuous series of cavities 386. These are cavities that are in communication with one another, such that fluid can flow through all of the series. The computer then determines whether, for any continuous series of cavities, any cross sectional area is smaller than a predetermined amount 388. A small cross sectional area serves as a choke point that restricts fluid flow. If a small cross sectional area exists, the series of cavities is identified as a pathway at step 390. In one embodiment, the program instructs the computer to identify a plurality of cavities in communication with one another, wherein each of the cavities has a cross-sectional area larger than a predetermined value. The cross-sectional area is the area located between outer surfaces, or walls, of the cavity, transverse to the path of a geophysical nanorobot traveling through the cavity. The plurality of cavities in communication with each other and all having a cross-sectional area larger than a predetermined value is defined as a pathway.

In one embodiment, geophysical nanorobots having a substantially spherical shape are used to identify the sizes of pathways. The nanorobots can have a plurality of different size diameters. A unique radio frequency identification tag can be used for each nanorobot or for each different size diameter. The program can instruct the computer to identify a location within the formation accessible to a first set of the plurality of geophysical nanorobots having one of the different sized diameters, but not accessible to a second set of the geophysical nanorobots having another one of the different sized diameters.

If a continuous series of pathways does not have any cross sectional area less than a predetermined amount (X), then the continuous cavities are marked as a high speed pathway in 400. In other words, if a plurality of cavities are in communication with each other, and each cavity has a cross-sectional area greater than a predetermined amount, the computer defines it as a pathway. The computer then identifies continuous high speed pathways between a water injection location and the extraction wellbore in 394. A high speed pathway linking the injection and extraction points could cause water drive fluid to bypass pockets of hydrocarbons. After mapping pathways and high speed pathways, the computer determines whether all pathways are mapped at 398. If so, the pore network model can be developed at 396. If not, the computer receives more data at 384 to further develop the models. The computer can also receive velocity data from the nanorobots at 402. In some embodiments, nanorobots can determine their own velocity. In other embodiments, the control computer can determine nanorobot velocity from wellbore receiver positional data (triangulation) received over a period of time. If the velocity of a nanorobot is greater than a predetermined amount (Y) for a specified length of time, the computer can use that data to conclude the nanorobot is traveling along a high speed pathway and, thus, map the pathway as such at 392. Data regarding the size and location of pathways can be used, for example, to determine the locations of future drive or extraction wellbores.

The Hydrocarbon Locator 310 set of instructions uses data from the nanorobots 114 to locate deposits of hydrocarbons 110. The map can indicate the types of fluid present in the various regions of the geophysical formation in which the nanorobots are located. In an exemplary embodiment, the computer program three-dimensionally plots a location point from each nanorobot, along with the rock formation type and fluid type reported by the nanorobot for that location. This can be performed by the computer executing instructions from the Formation Mapper program. By using data from hundreds or thousands of nanorobots, the computer is able to interpolate a complete map of the geological formation and its contents, including a three dimensional perimeter of each hydrocarbon formation 536. One of the mapping functions is to determine the location of bypassed hydrocarbon deposits 540. One skilled in the art will appreciate the importance of determining the location of such deposits.

Figure 27:
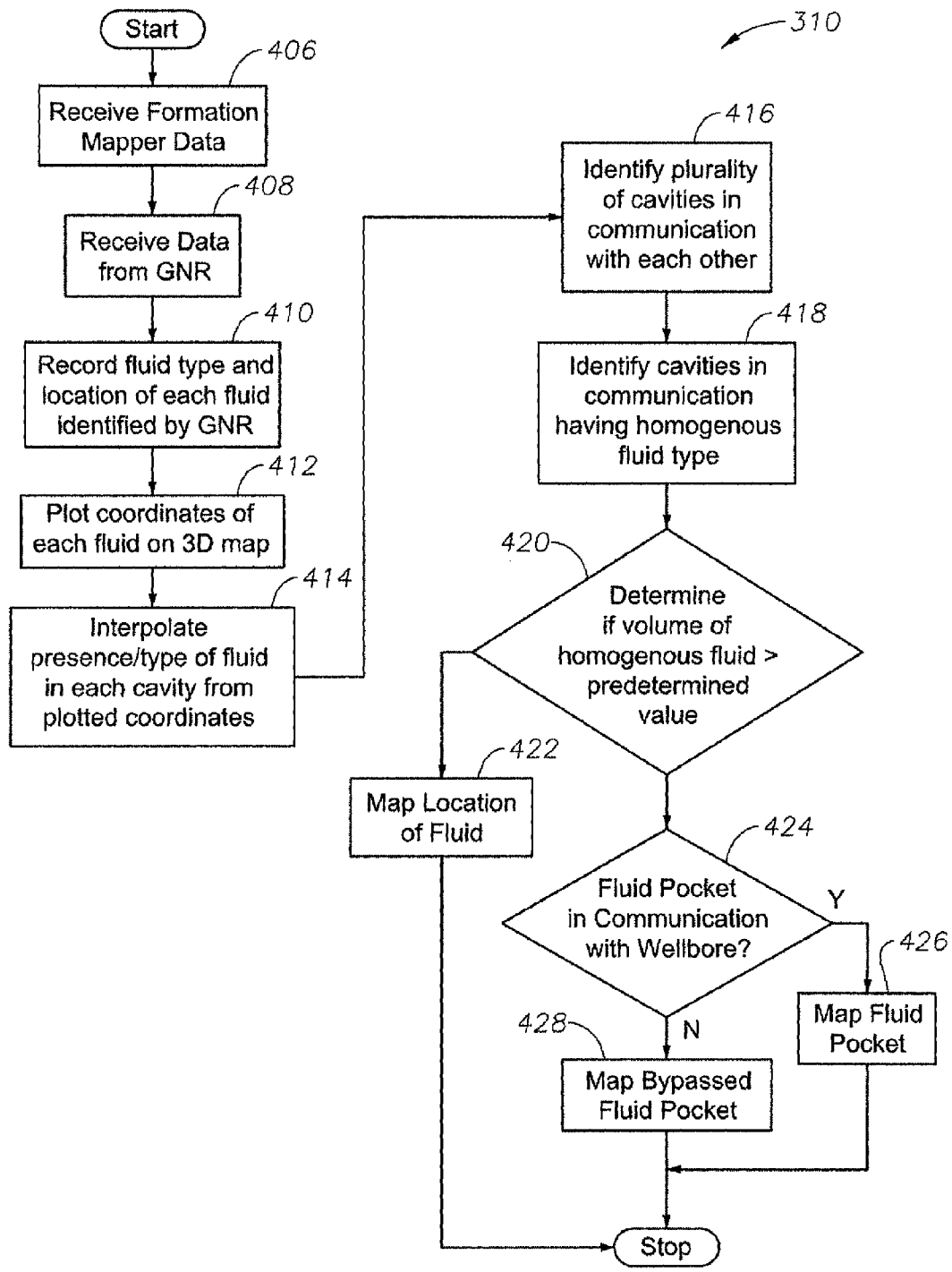
FIG. 27 is a flowchart of operational locating of hydrocarbon formations using data from a plurality of geophysical nanorobots according to another embodiment of the present invention.

In one embodiment, shown in FIG. 27, the Hydrocarbon Locator 310 set of instructions causes the computer to receive 3D formation map data created in response to the Formation Mapper 304 set of instructions 406. The computer then receives fluid data from the nanorobots 408. The fluid data includes the types of fluid and, thus, whether or not the fluids are hydrocarbons. The type and location of each fluid is recorded at 410 and plotted on the 3D map at 412. From this data, the computer can interpolate areas to indicate the presence of and type of fluid in each cavity at 414. The computer then identifies regions where a plurality of cavities are in communication with each other at 416. By determining the fluids in each cavity 414 and the cavities in communication 416, the computer can identify cavities in communication having a homogenous fluid type 418. The computer, thus, identifies a three-dimensional region filled with a homogenous fluid to define a fluid pocket within the geophysical formation. If the cavities with a homogenous fluid type, together, have less than a predetermined volume of fluid 420, the fluids are plotted on the map at 422. If the cavities with homogenous fluids have greater than a predetermined amount of the fluid, the computer determines whether the fluid is in communication with the wellbore at 424. If so, the fluid is mapped as a fluid pocket at 426. If not, the fluid is mapped as a bypassed fluid pocket at 428.

The Gas Plume Mapper 312 set of instructions uses data from the nanorobots 114 to map the locations and movements of gas plumes within the formation. In an application wherein the nanorobots enter a porous geological formation used to store a gas, such as carbon dioxide or natural gas, the control computer can be used to create maps and models depicting the travel of the gas plume within the rock formation. The data from the nanorobots sensors can be used to monitor how much of the injected gas goes into solution with in situ fluids and whether and how it affects the chemical and physical properties of the fluids. Furthermore, the data can show how a rock mineral reacts with injected gas. The plume and pressure data can be interpreted to show whether gas is leaking out of the storage facility to the surface or to an adjacent rock formation.

Figure 28:
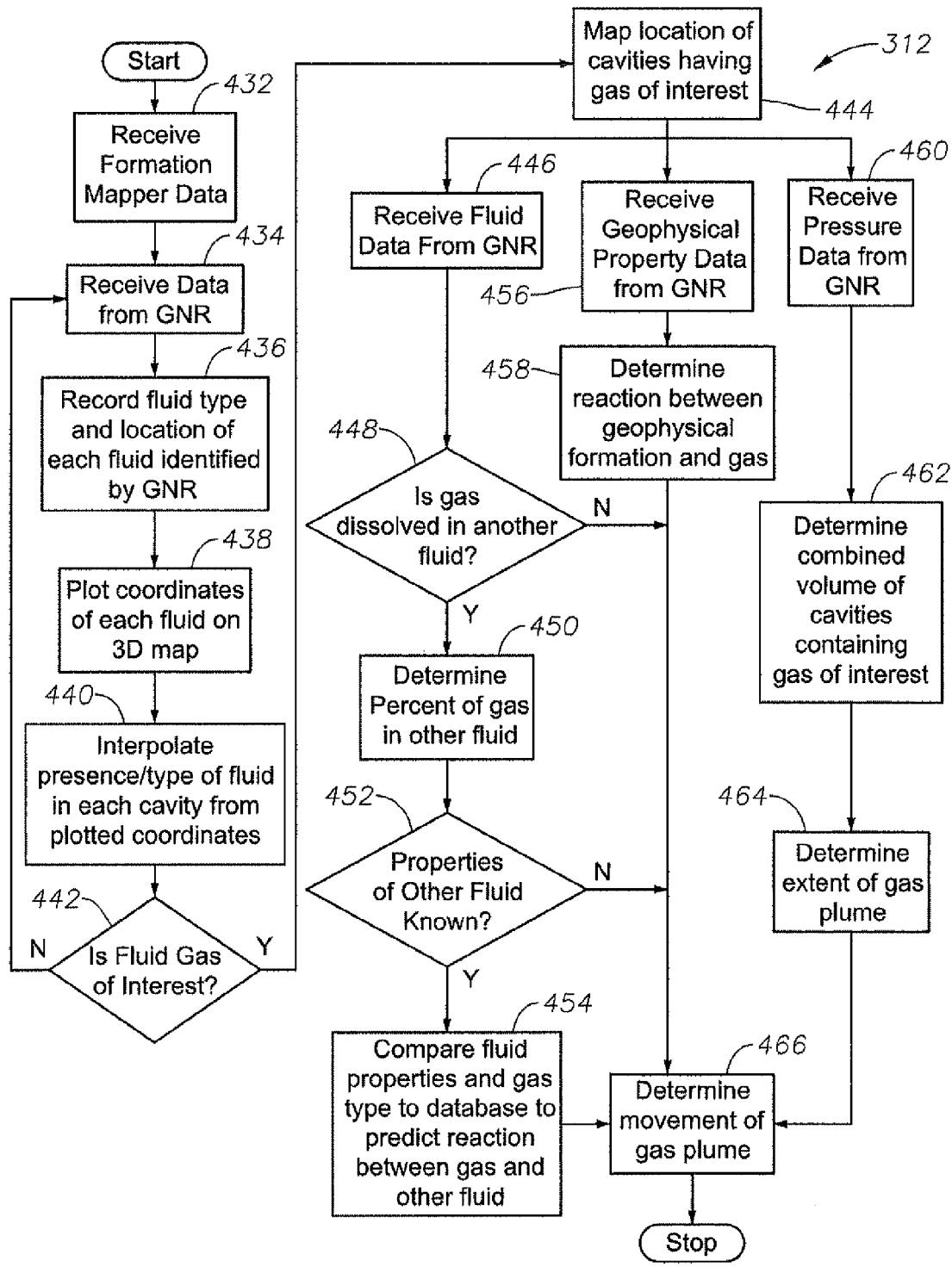
FIG. 28 is a flowchart of operational mapping gas plumes using data from a plurality of geophysical nanorobots according to another embodiment of the present invention.

In one embodiment, shown in FIG. 28, the Gas Plume Mapper 312, when executed, causes the computer to perform the following instructions. The computer receives Formation Data from the Formation Mapper 304. The computer also receives data from the nanorobots in step 434. This data includes fluid data that may not have been included in the Formation Mapper data. The properties of the fluids, including type, location, and pressure, are recorded by the computer in 436. The coordinates of each fluid are plotted on the 3D map 438. The computer then interpolates the presence and type of fluid in each cavity 440. The computer determines whether the identified fluid is a gas of interest 442. If not, the computer receives additional data from the nanorobots until it receives information regarding a gas of interest. If a fluid is a gas of interest, the locations of the cavities having the gas of interest are identified on the 3D map 444. The computer receives fluid property data regarding other fluids that may be in the same cavities that contain the gas of interest 446. From this data, the computer determines whether the gas of interest is dissolved in the other fluid 448. If so, the computer can determine the percent of gas present in the other fluid 450. The computer can also determine whether properties of the other fluid are known, such as in a database 452. If so, the known properties of the other fluid can be evaluated to determine whether a reaction between the fluids is likely and the nature of any reaction 454. After mapping the locations of cavities having gas of interest at step 444, the computer can receive additional geophysical property data from the nanorobots 456. The additional data can include, for example, data regarding the type of rock. This data, plus database data, can be evaluated by the computer to determine whether the rock material is likely to react with the gas, and evaluate the type of any potential reaction 458. Also after mapping cavities having the gas of interest 444, the computer can receive pressure data, such as the pressure of the gas at various locations, from the nanorobots 460. With the pressure data and the 3D map, the computer can determine the volume of gas present in the cavities at 462. With the map showing location and pressure, the computer can determine the extent of the gas plume 464. Finally, the dissolution data, rock reaction data, and gas plume data can be combined by the computer to predict the movement of the gas plume 466.

The Potable Water Locator 314 set of instructions uses fluid and mineral data collected by the nanorobots 114 and transmitted to the nanorobot control computer to find underground water sources and determine whether the water is potable water.

Figure 29:
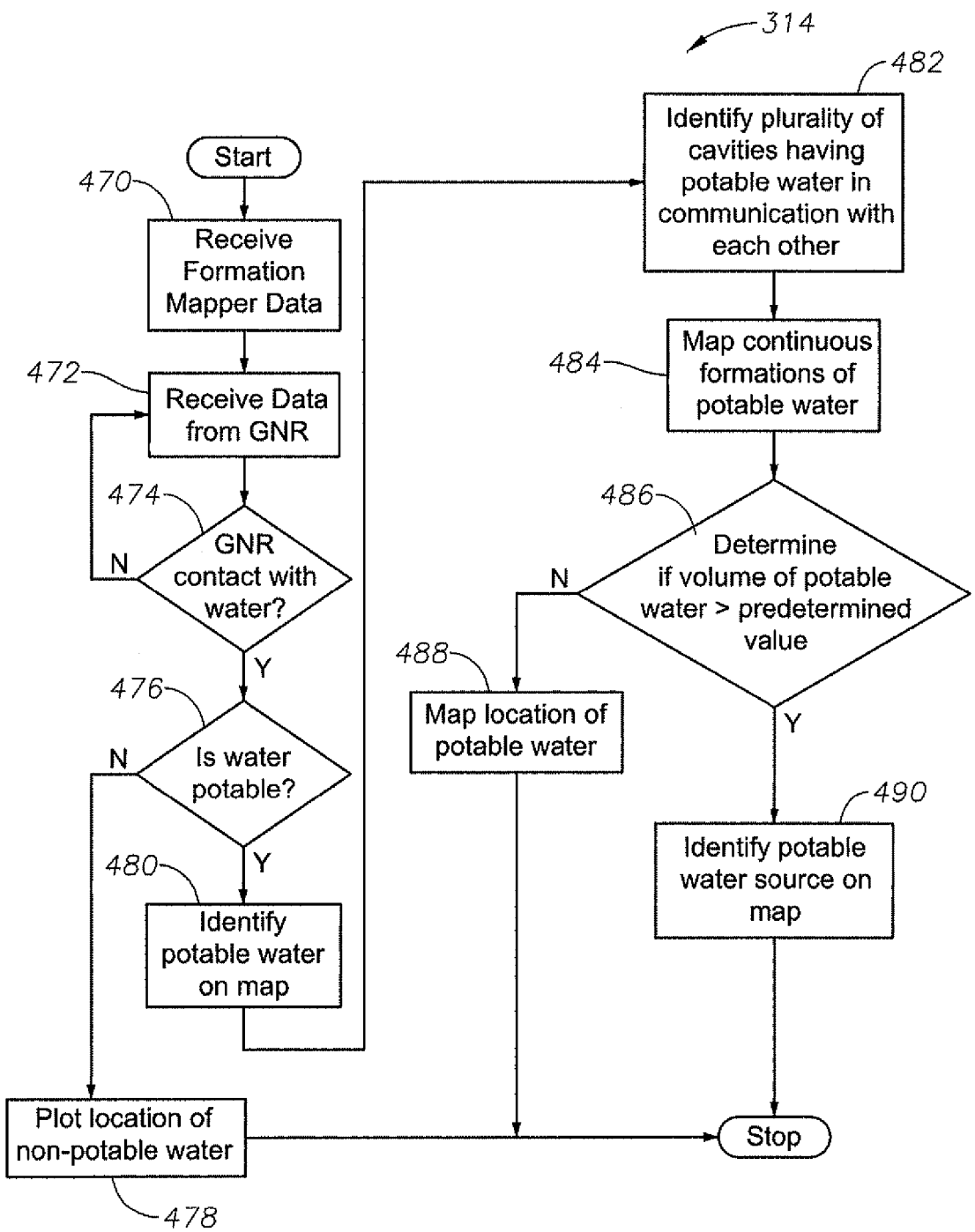
FIG. 29 is a flowchart of operational mapping potable water formations using data from a plurality of geophysical nanorobots according to another embodiment of the present invention.

In one embodiment, shown in FIG. 29, the Potable Water Locator 314, when executed, causes the computer to perform the following instructions. The computer receives 3D formation map information from the Formation Mapper set of instructions 470. The computer also receives data from the nanorobots regarding fluids in contact with the nanorobots 472. If the fluid is not water, the computer waits until it receives additional data 474. If the fluid is water, the computer determines from the data whether the water is potable 476. This data can be determined, for example, from fluid properties including resistance, pH, and bacteria analysis. If the water is not potable, it is plotted as a non-potable water source on the map 478. If the water is potable, it is identified as a potable water source 480. The computer then identifies a plurality of cavities having potable water that are in communication with each other 482. Each plurality of cavities in communication with each other and having potable water is mapped as a continuous formation of potable water 484. The computer then determines whether the volume of the potable water formation is greater than a predetermined value 486. If not, the formation is mapped as a location of potable water. If so, the formation is mapped as a source of potable water 490.

Figures 25, 30:
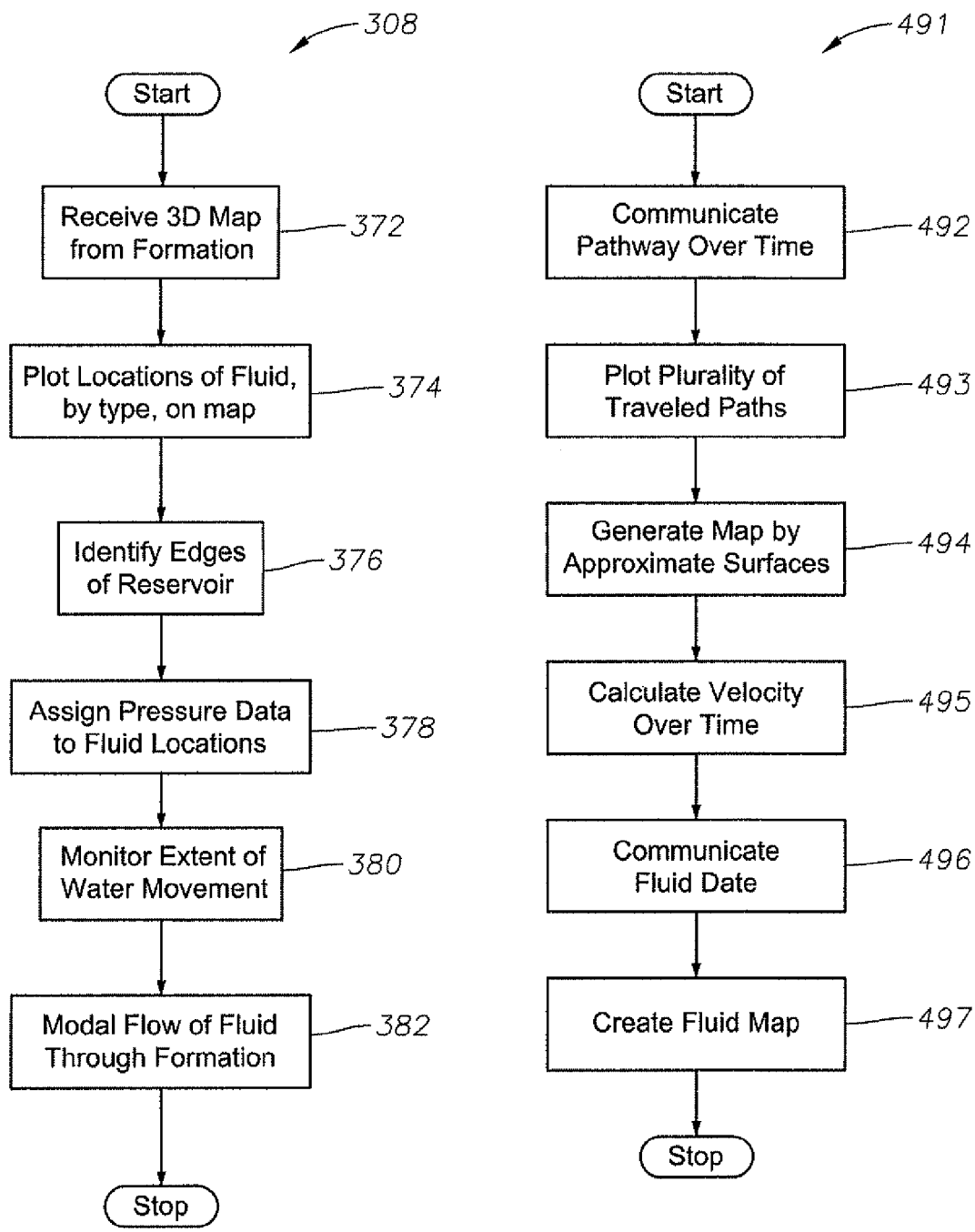
FIG. 25 is a flowchart of operational mapping fluid formations using data from a plurality of geophysical nanorobots according to another embodiment of the present invention.
FIG. 30 is a flowchart of approximating surface locations from the positions of geophysical nanorobots according to another embodiment of the present invention.

In one embodiment, shown in FIG. 30, the Surface Approximator 491 set of instructions, when executed, causes the computer to perform the following functions. In step 492, the computer receives the locations of each of the nanorobots over a period of time. The locations can be determined by, for example, triangulating, responsive to a signal reflected by each of the plurality of geophysical robots from one or more transmitters associated with one or more wellbores to one or more receivers associated with one or more wellbores. By receiving multiple locations, over time, the computer can plot the path traveled by each nanorobot within the formation 493. From the paths traveled by each nanorobot, the computer can generate an interpolated map 494. The interpolated map can approximate the locations of surfaces be determining, from the traveled paths, where the nanorobots are not able to travel and concluding that the nanorobots cannot travel through a surface. From the pathways, over time, the computer can estimate the velocity of each of the nanorobots using a time/distance calculation. From this velocity, and knowing that the nanorobots are traveling within the fluid flow of the geophysical formation, the computer can estimate with velocity of the fluid passing through each of the plurality of traveled paths 495. If the nanorobot has a fluid sensor, the computer can receive the fluid data indicating the type at each of a plurality of locations within the formation, and then plot the type of fluid on the interpolated map to display a physical representation of fluids within the formation 496.

While the invention has been shown or described in only some of its forms, it should be apparent to those skilled in the art that it is not so limited, but is susceptible to various changes without departing from the scope of the invention.

Furthermore, recitation of the term about and approximately with respect to a range of values should be interpreted to include both the upper and lower end of the recited range. As used herein, the terms first, second, third and the like should be interpreted to uniquely identify elements and do not imply or restrict to any particular sequencing of elements or steps.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a", "an" and "the" include plural referents, unless the context clearly dictates otherwise.

Optional or optionally indicates that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

In the drawings and specification, there have been disclosed a typical preferred embodiment of the invention, and although specific terms are employed, the terms are used in a descriptive sense only and not for purposes of limitation. The invention has been described in considerable detail with specific reference to these various illustrated embodiments. It will be apparent, however, that various modifications and changes can be made within the spirit and scope of the invention as described in the foregoing specification and as defined in the appended claims.

This patent application is a divisional of U.S. Non-Provisional patent application Ser. No. 12/722,357, titled "System, Method, and Nanorobot to Explore Subterranean Geophysical Formations" and filed on Mar. 11, 2010, which claims the benefit of and priority to U.S. Provisional Patent Application No. 61/159,943, titled "System, Method, and Nanorobot to Explore Subterranean Geophysical Formations" and filed on Mar. 13, 2009, the contents both of which are incorporated herein by reference in their entireties.

That claimed is:

1. A system to measure properties in a geophysical formation, the system comprising:
   a wellbore lining positioned in a wellbore;
   a plurality of fixed radio frequency receivers spaced apart along the longitudinal extent of and connected to the wellbore lining to receive radio frequency transmissions at one or more preselected radio frequencies;
   a plurality of transmitter assemblies positioned external to the wellbore lining and at a plurality of substantially horizontally and vertically spaced apart locations within the geophysical formation, each of the plurality of transmitter assemblies including:
      a body,
      a sensor connected to the body and positioned to detect the presence of one or more hydrocarbons within the geophysical formation,
      a radio frequency transmitter connected to the body and configured to transmit positional data and hydrocarbon characteristic data from the geophysical formation when the transmitter assembly is positioned therein,
      a power supply connected to the body to supply power to the transmitter and the sensor, and
      a propulsion device associated with the body to propel the transmitter assembly through pathways within the geophysical formation;
   a machine in communication with each of the plurality of fixed radio frequency receivers, the machine including a processor, a display in communication with the processor, and a non-transitory, computer-readable storage medium with an executable program stored therein, wherein the program instructs the processor to perform the following steps:
      receiving positional data from each of the plurality of transmitter assemblies, the positional data indicating the location of the transmitter assemblies at a point in time and comprising interior surface location data received from a plurality of the transmitter assemblies, each of the interior surface location data defining a sensed three-dimensional location of a point on an interior surface within the geophysical formation for the respective transmitter assembly;
      plotting, responsive to receipt of the positional data, at least one positional data point for each of the plurality of transmitter assemblies;
      combining the positional data from the plurality of transmitter assemblies to create a representation of a three-dimensional physical map of at least a portion of the geophysical formation, the physical map including an indication of a three dimensional location of each of the plurality transmitter assemblies within the interior surface of the geophysical formation;
      receiving fluid data from each of the plurality of transmitter assemblies, the fluid data indicating the type and location of fluid located at each of the plurality of substantially horizontally and vertically spaced apart locations within the geophysical formation; and
      creating a fluid map on the display by plotting the type and location of fluids onto the physical map, the fluid map comprising pathways through the geophysical formation, pockets of hydrocarbons within the geophysical formation, and interior surface boundaries of the geophysical formation.

2. A system as defined in claim 1, wherein the propulsion device of each of the plurality of transmitter assemblies comprises one or more of the following: a propeller, a flagella, a membrane, a crawler, and a Brownian motor.

3. A transmitter assembly, the transmitter assembly comprising:
   a body;
   a sensor connected to the body and positioned to detect the presence of one or more hydrocarbons within the geophysical formation;
   a radio frequency transmitter connected to the body and configured to transmit positional data and hydrocarbon characteristic data from the geophysical formation when the transmitter assembly is positioned therein, the positional data indicating the location of the transmitter assembly at a point in time and comprising interior surface location data, the interior surface location data defining a sensed three-dimensional location of a point on an interior surface within a geophysical formation for the transmitter assembly;
   a power supply connected to the body to supply power to the transmitter and the sensor; and
   a propulsion device associated with the body to propel the transmitter assembly through pathways within the geophysical formation.

4. A transmitter assembly as defined in claim 3, wherein the propulsion device of each of the transmitter assemblies comprises one or more of the following: a flagella, a membrane, and a Brownian motor.

5. A system to measure properties in a geophysical formation, the system comprising:
   a wellbore lining positioned in a wellbore;
   a plurality of fixed radio frequency receivers spaced apart along the longitudinal extent of and connected to the wellbore lining to receive radio frequency transmissions at one or more preselected radio frequencies;
   a plurality of transmitter assemblies positioned external to the wellbore lining and at a plurality of substantially horizontally and vertically spaced apart locations within the geophysical formation, each of the plurality of transmitter assemblies including:

one or more sensors positioned to detect presence of one or more hydrocarbons within the geophysical formation, and configured to detect a location of the transmitter assembly within the geophysical formation and to sense a three-dimensional location of a point on an interior surface within the geophysical formation;

a radio frequency transmitter configured to transmit positional data for the geophysical formation when the transmitter assembly is positioned in the geophysical formation, the positional data indicating the location of the transmitter assembly and comprising interior surface location data defining the sensed three-dimensional location of the point on the interior surface within the geophysical formation; and a propulsion device configured to propel the transmitter assembly through pathways within the geophysical formation.

6. A system as defined in claim 5, wherein the propulsion device of each of the plurality of transmitter assemblies comprises one or more of the following: a propeller, a flagella, a membrane, a crawler, and a Brownian motor.

7. A system as defined in claim 5, wherein the one or more sensors comprises one or more ultrasonic non-contact sensors configured to sense a three-dimensional location of a point on an interior surface within the geophysical formation.

8. A system as defined in claim 5, wherein the sensed three-dimensional location of the point on the interior surface within the geophysical formation corresponds to a location at which the transmitter assembly is determined to have contacted the interior surface within the geophysical formation.

9. A transmitter assembly configured to be positioned at a location within a geophysical formation external to a wellbore lining in a wellbore, the transmitter assembly comprising:
one or more sensors configured to detect a location of the transmitter assembly within the geophysical formation and to sense a three-dimensional location of a point on an interior surface within the geophysical formation; and a radio frequency transmitter configured to transmit positional data for the geophysical formation when the transmitter assembly is positioned in the geophysical formation, the positional data indicating the location of the transmitter assembly and comprising interior surface location data defining the sensed three-dimensional location of the point on the interior surface within the geophysical formation; and a propulsion device configured to propel the transmitter assembly through pathways within the geophysical formation.

10. A transmitter assembly as defined in claim 9, wherein the propulsion device comprises one or more of the following: a propeller, a flagella, a membrane, a crawler, and a Brownian motor.

11. A transmitter assembly as defined in claim 9, wherein the one or more sensors comprises one or more ultrasonic non-contact sensors configured to sense a three-dimensional location of a point on an interior surface within the geophysical formation.

12. A transmitter assembly as defined in claim 9, wherein the sensed three-dimensional location of the point on the interior surface within the geophysical formation corresponds to a location at which the transmitter assembly is determined to have contacted the interior surface within the geophysical formation.

* * * * *